(12) United States Patent
Ishikawa et al.

(10) Patent No.: US 12,393,200 B2
(45) Date of Patent: Aug. 19, 2025

(54) INFORMATION PROCESSING DEVICE, INFORMATION PROCESSING SYSTEM, METHOD, AND PROGRAM

(71) Applicant: Sony Group Corporation, Tokyo (JP)

(72) Inventors: Tatsuya Ishikawa, Tokyo (JP); Chao Wang, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 238 days.

(21) Appl. No.: 17/927,375

(22) PCT Filed: May 19, 2021

(86) PCT No.: PCT/JP2021/018915
§ 371 (c)(1),
(2) Date: Nov. 23, 2022

(87) PCT Pub. No.: WO2021/246169
PCT Pub. Date: Dec. 9, 2021

(65) Prior Publication Data
US 2023/0205234 A1    Jun. 29, 2023

(30) Foreign Application Priority Data

Jun. 1, 2020   (JP) .................................. 2020-095381

(51) Int. Cl.
*G05D 1/00*   (2024.01)
*G05B 19/4155*   (2006.01)

(52) U.S. Cl.
CPC ........... *G05D 1/12* (2013.01); *G05B 19/4155* (2013.01); *G05D 1/0212* (2013.01); *G05B 2219/31081* (2013.01)

(58) Field of Classification Search
CPC ...... G05D 1/12; G05D 1/0212; G05D 1/0246; G05B 19/4155; G05B 2219/31081
See application file for complete search history.

(56) References Cited

U.S. PATENT DOCUMENTS

2019/0302792 A1* 10/2019 Asahara ............... G05D 1/0251
2021/0365040 A1* 11/2021 Tomono .................. B25J 11/00

FOREIGN PATENT DOCUMENTS

JP      2006155349 A  *  6/2006
JP      4288203 B2  *  7/2009
(Continued)

OTHER PUBLICATIONS

International Search Report and Written Opinion mailed on Jul. 20, 2021, received for PCT Application PCT/JP2021/018915, filed on May 19, 2021, 10 pages including English Translation.

*Primary Examiner* — Anne Marie Antonucci
*Assistant Examiner* — Jewel Ashley Kuntz
(74) *Attorney, Agent, or Firm* — XSENSUS LLP

(57) ABSTRACT

Provided are a device and a method for efficiently creating a following path of the target to be followed by a mobile device to enable reliable follow-up. A movement path creation unit is included that creates a path that is a following path on which a target is to be followed by a mobile device. The movement path creation unit sequentially sets a piece of path position information (waypoint) near the target, and sequentially connects the set pieces of path position information to create the path. The movement path creation unit sets the piece of path position information at a position determined in accordance with a predetermined rule based on a position and a travel direction of the target. When the target has moved a predetermined distance, a new piece of path position information is set.

12 Claims, 26 Drawing Sheets

(56) References Cited

FOREIGN PATENT DOCUMENTS

| | | | |
|---|---|---|---|
| JP | 2010-238132 A | | 10/2010 |
| JP | 2014-006122 A | | 1/2014 |
| JP | 2018067183 A | * | 4/2018 |
| JP | 2019-179398 A | | 10/2019 |
| WO | 2019/069626 A1 | | 4/2019 |
| WO | 2020/035902 A1 | | 2/2020 |

* cited by examiner

INFORMATION PROCESSING DEVICE, INFORMATION PROCESSING SYSTEM, METHOD, AND PROGRAM

CROSS-REFERENCE TO RELATED APPLICATIONS

The present application is based on PCT filing PCT/JP2021/018915, filed May 19, 2021, which claims priority to Japanese Application No. 2020-095381, filed Jun. 1, 2020, the entire contents of each are incorporated herein by reference.

TECHNICAL FIELD

The present disclosure relates to an information processing device, an information processing system, a method, and a program. More specifically, the present disclosure relates to an information processing device, an information processing system, a method, and a program for creating a movement path when a mobile device such as a robot or drone follows a person, a car, or the like.

BACKGROUND ART

In recent years, the use of autonomous mobile objects such as robots, self-driving vehicles, and drones has increased.

Among such autonomous mobile objects, there is one that is configured to move following a target which is, for example, another mobile object or a person in front of the autonomous mobile object.

A conventional technology of a mobile object that follows a target is described in, for example, PTL 1 (JP 2014-006122 A).

According to target-following movement, it is possible to select and move a route on which the target has already moved, which has the advantage of reducing the risk of colliding with obstacles and thus enabling safe driving.

However, in order to accurately follow a target moving in various directions, it is necessary to analyze the direction of movement of the target at high speed, resulting in a problem of increased processing load.

CITATION LIST

Patent Literature

[PTL 1]

JP 2014-006122 A

SUMMARY

Technical Problem

The present disclosure has been made in view of, for example, the above-mentioned problem, and an object thereof is to provide an information processing device, an information processing system, a method, and a program for creating a following path that enables highly accurate target following with reduced processing load.

Solution to Problem

A first aspect of the present disclosure is an information processing device including a movement path creation unit that creates a path that is a following path on which a target is to be followed by a mobile device,
wherein the movement path creation unit
sequentially sets a piece of path position information (waypoint) near the target, and
sequentially connects set pieces of path position information to create the path.

Further, a second aspect of the present disclosure is an information processing system including a mobile device and an information processing device capable of communicating with the mobile device, wherein
the information processing device performs:
processing of creating a path on which a target, is to be followed by the mobile device, the processing of creating a path including
processing of sequentially setting a piece of path position information (waypoint) near the target, and
processing of creating a path connecting adjacent pieces of path position information; and
further creating mobile device control information for moving the mobile device along the created path and transmitting the mobile device control information to the mobile device, and
the mobile device moves according to the mobile device control information received from the information processing device to perform processing of following the target.

Further, a third aspect of the present disclosure is
an information processing method performed in an information processing device, the information processing device including a movement path creation unit that creates a path that is a following path on which a target is to be followed by a mobile device,
the information processing method including, by the movement path creation unit,
sequentially setting a piece of path position information (waypoint) near the target; and
sequentially connecting set pieces of path position information to create the path.

Further, a fourth aspect of the present disclosure is
an information processing method performed in an information processing system including a mobile device and an information processing device capable of communicating with the mobile device,
the information processing method including, by the information processing device,
processing of creating a path on which a target is to be followed by the mobile device, the processing of creating a path including
processing of sequentially setting a piece of path position information (waypoint) near the target, and
processing of creating a path connecting adjacent pieces of path position information; and
further creating mobile device control information for moving the mobile device along the created path and transmitting the mobile device control information to the mobile device,
the information processing method including moving the mobile device in accordance with the mobile device control information received from the information processing device to perform processing of following the target.

Further, a fifth aspect of the present disclosure is
a program for causing an information processing device to execute information processing,
the information processing device including a movement path creation unit that creates a path that is a following path on which a target is to be followed by a mobile device, the program causing the movement path creation unit to execute:

processing of sequentially setting a piece of path position information (waypoint) near the target, and processing of sequentially connecting set pieces of path position information to create the path.

The program of the present disclosure is, for example, a storage medium provided in a computer-readable form or a program that can be provided by a communication medium, the storage medium or the program being provided to an information processing device or a computer system that can execute various program codes, for example. By providing such a program in a computer-readable form, processing according to the program can be implemented on an information processing device or a computer system.

Still other objects, features and advantages of the present disclosure will become apparent by more detailed description on the basis of the embodiments of the present disclosure and the accompanying drawings described below. In addition, a system as used herein is a set of logical components of a plurality of devices and it does not matter whether or not all the components are arranged in a single housing.

According to the configuration of one embodiment of the present disclosure, it is possible to realize a device and a method for efficiently creating a following path of a target to be followed by a mobile device to enable reliable follow-up. Specifically, for example, it includes a movement path creation unit that creates a path that is the following path on which the target is to be followed by the mobile device. The movement path creation unit sequentially sets a piece of path position information (waypoint) near the target, and sequentially connects set pieces of path position information to create the path. The movement path creation unit sets the piece of path position information at a position determined in accordance with a predetermined rule based on a position and a travel direction of the target. When the target moves a predetermined distance, a new piece of path position information is set.

With this configuration, it is possible to realize a device and a method for efficiently creating a following path of a target to be followed by a mobile device to enable reliable follow-up.

Note that the effects described in the present specification are merely exemplary and not limited, and may have additional effects.

DESCRIPTION OF EMBODIMENTS

An information processing device, an information processing system, a method, and a program according to the present disclosure will be described below in detail with reference to the accompanying drawings. The description will be given in the following order.

1. Example of Basic Processing of Target Following Processing according to Present Disclosure 2. Configuration Example of Mobile Device (Robot)
3. Specific Examples of Processing of Creating Path Position Information (Waypoint) and Processing of Creating Path (Movement Path)
4. Processing of Controlling Movement Speed of Mobile Device (Robot)
5. Example of Target Following Processing by Flying Mobile Device
6. Configuration Example of Mobile Device and Information Processing Device according to Present Disclosure
7. Summary of Configuration of Present Disclosure 1. Example of Basic Processing of Target Following Processing According to Present Disclosure An example of basic processing (basic algorithm) of target following processing according to the present disclosure will first be described.

Figure 1:
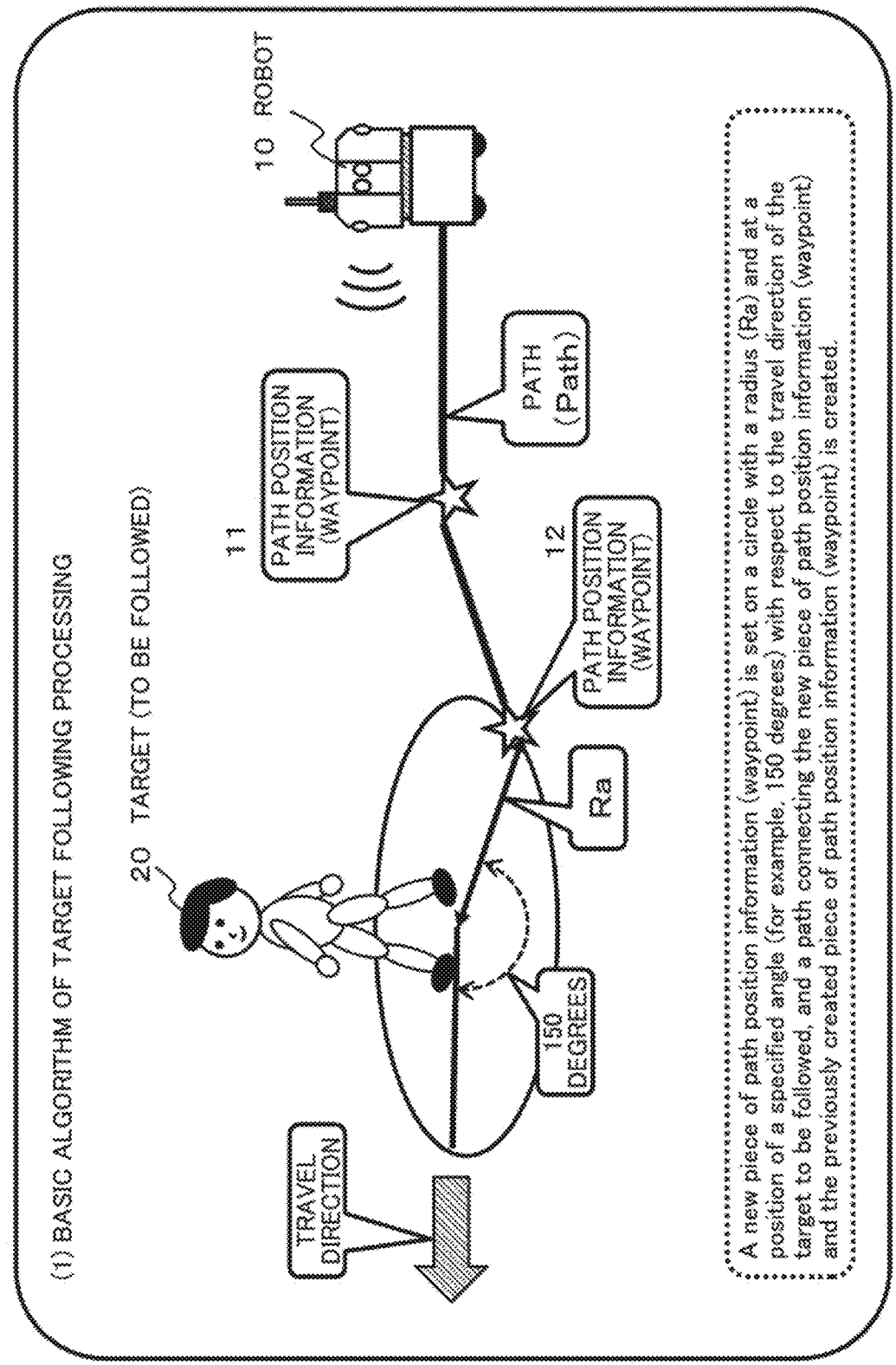
FIG. 1 is a diagram for explaining an example of basic processing (basic algorithm) of target following processing according to the present disclosure.

FIG. 1 is a diagram for explaining the example of basic processing of target following processing according to the present disclosure.

A robot 10 illustrated in. FIG. 1 is a mobile device according to the present disclosure. The robot 10 moves to follow a target (an object to be followed) 20. In the following embodiment, an autonomous travel robot will be described as an example of a mobile device that follows the target (the object to be followed) 20. However, examples of the mobile device according to the present disclosure include not only such an autonomous mobile robot but also various mobile devices such as a self-driving vehicle and a drone.

In order for the robot 10 illustrated in FIG. 1 to follow the target 20, it is necessary to create a movement path (path) for the robot 10. The robot 10 moves along the created path.

To set and control the movement path for the robot 10, such as for path creation processing, a data processing unit of an information processing device provided inside the robot 10 or an external information processing device that can communicate with the robot 10 may be used.

In the following embodiment, an example will be described as an example in which the data processing unit of the information processing device inside the robot 10 creates a path. However, in the following description, the processing to be performed by the robot 10 may be performed by the information processing device that can communicate with the robot 10.

The target 20 illustrated in FIG. 1 is moving in a travel direction indicated by an arrow as illustrated.

The robot 10 sequentially sets a piece of path position information (waypoint) near the moving target 20. The robot 10 has, for example, a map corresponding to the movement; plane of the target 20, and sequentially sets and records a piece of path position information (waypoint) in this map as the target 20 moves.

A piece of path position information 12 illustrated in FIG. 1 is a piece of path position information (waypoint) created based on the current position of the target 20.

A piece of path position information 11 illustrated in FIG. 1 is a piece of path position information created based on a position of the target 20 in the past.

A line connecting the pieces of path position information (waypoints) sequentially created as the target 20 moves is a path, that is, a movement path (path) for the robot 10.

The robot 10 holds a map corresponding to the movement plane of the target 20 in a storage unit, sequentially records a piece of path position information (waypoint) in this map, and further records a path connecting the pieces of path position information (waypoints).

The robot 10 follows the target 20 by moving along the path connecting the pieces of path position information (waypoints).

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

As the target 20 to be followed moves, the robot 10 sequentially sets a new piece of path position information (waypoint) near the target 20 in accordance with a predetermined rule.

Processing of setting a new piece of path position information (waypoint) will be described.

The piece of path position information 12 illustrated in FIG. 1 is a new piece of path position information (waypoint) created based on the current position of the target 20.

In the example illustrated in FIG. 1, the new piece of path position information (waypoint) 12 is set on a circle with a radius Ra centered on the target 20 and at an angular position of 150 degrees counterclockwise with respect to the travel direction of the target 20 to be followed.

Specifically, the setting rule for path position information (waypoint) applied here is as follows.

Rule: Set a new piece of path position information (waypoint) on a circle with a radius Ra centered on the target and at an angular position of a specified angle (for example, 150 degrees counterclockwise) with respect to the travel direction of the target to be followed.

Note that this Rule is an example, and various values can be used as the size of the radius Ra and parameters such as an angle of 150 degrees.

The piece of path position information (waypoint) is sequentially set as the target 20 moves. For example, when the target 20 moves a predetermined distance (L), a new piece of path position information (waypoint) is set.

Processing of sequentially creating a piece of path position information (waypoint) will be described with reference to FIG. 2.

Figure 2:
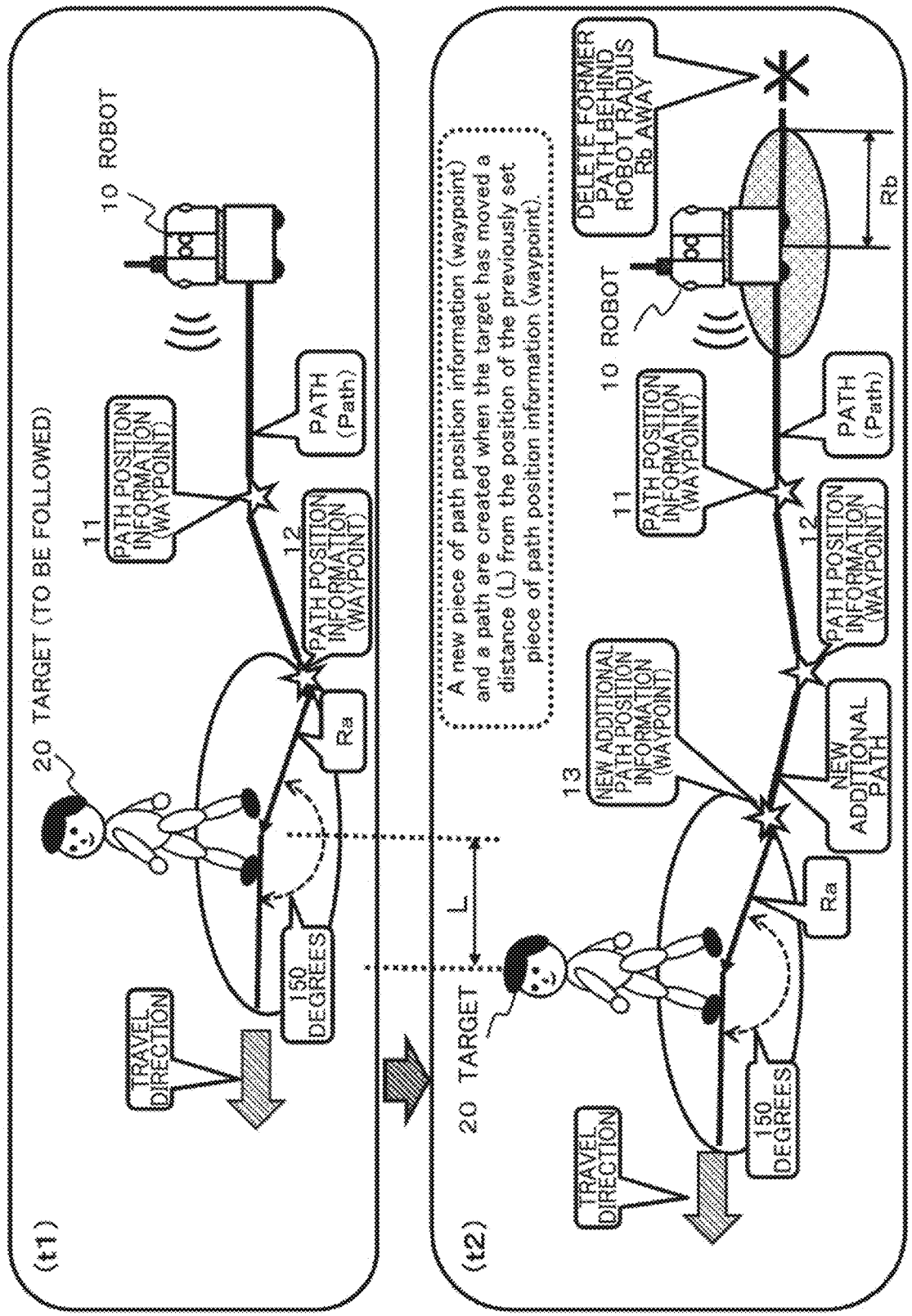
FIG. 2 is a diagram for explaining processing of sequentially creating a piece of path position information (waypoint).

FIG. 2 illustrates the target 20 at a time (t1) in the upper part, and the target 20 at the subsequent time (t2) in the lower part.

The state at the time (t1) illustrated in the upper part indicates a state in which the new piece of path position information 12 is created at the position of the target 20 in accordance with the above-described Rule.

The state at the time (t2) illustrated in the lower part is a state in which the target 20 has moved a distance (L) from the position at the time (t1).

In this way, when the target 20 moves the predetermined distance (L), a new piece of path position information (waypoint) is set.

At the position of the target 20 at the time (t2) illustrated in the lower part, the above-described Rule is performed, that is, Rule: Set a new piece of path position information (waypoint) on a circle with a radius Ra centered on the target and at an angular position of a specified angle (for example, 150 degrees counterclockwise) with respect to the travel direction of the target to be followed.

Note that various settings are possible for the angle for a piece of path position information (waypoint) to be set.

A new piece of path position information 13 is set in accordance with the above-described Rule.

Furthermore, the data processing unit of the robot 10 creates a path connecting the new piece of path position information 13 and the previously created piece of path position information 12.

These pieces of information are recorded, for example, in a map stored in the storage unit inside the robot 10.

The robot 10 moves along the path connecting the pieces of path position information. This movement processing makes it possible to reliably follow the target 20.

The processing executed by the robot 10 includes only the processing of creating a piece of path position information (waypoint) in accordance with the above-described Rule and the processing of creating a path connecting the pieces of path position information (waypoints), so that it is possible to create a reliable following route with a less processing load.

The processing of creating a piece of path position information (waypoint) and the sequence of the processing of creating a path connecting the pieces of path position information (waypoints) (basic algorithm), which are described with reference to FIGS. 1 and 2, will be described with reference to the flowchart illustrated in FIG. 3.

Figure 3:
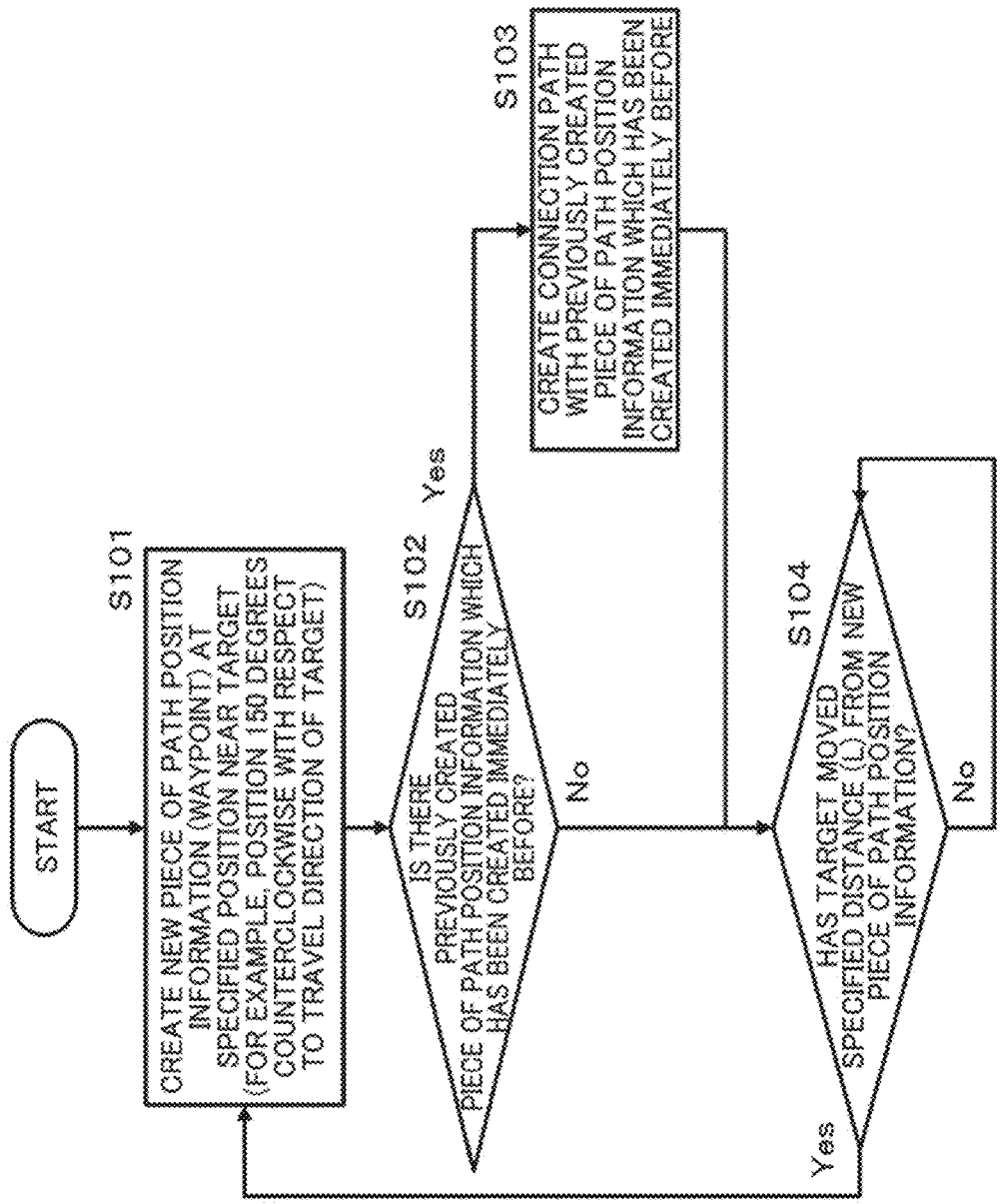
FIG. 3 illustrates a flowchart for explaining the sequence of processing of creating a path connecting the pieces of path position information (waypoints).

The processing according to the flowcharts illustrated in FIG. 3 and subsequent figures are performed according to a program stored in a memory which is included inside the robot 10 or an information processing device that can communicate with the robot 10.

For example, it is performed under the control of a control unit (data processing unit) configured of a CPU or the like, having a program execution function, of the robot 10 or an information processing device that can communicate with the robot 10.

In the following description, it is assumed that the data processing unit inside the robot 10 performs the processing according to the flow as an example. Processing of each step in the flow illustrated in FIG. 3 will be sequentially described below.

(Step S101)

First, in step S101, the data processing unit of the robot 10 creates in accordance with the predetermined Rule a new piece of path position information (waypoint) at a specified position near the target to be followed, for example, a position 150 degrees counterclockwise with respect to the travel direction of the target).

Note that various settings are possible for the angle for a piece of path position. information (waypoint) to be set.

(Step S102)

Next, in step S102, the data processing unit of the robot 10 determines whether or not there is a previously created piece of path position information (waypoint) which has been created immediately before the new piece of path position information (waypoint) created in step S101.

A map in which pieces of path position information (waypoints) are recorded is recorded in the storage unit of the robot 10.

The data processing unit of the robot 10 refers to the map stored in the storage unit and determines whether or not there is a previously created piece of path position information.

When there is a previously created piece of path position information, the processing proceeds to step S103.

On the other hand, when there is no previously created piece of path position information, the processing proceeds to step S104.

(Step S103)

In step S102, when it is determined that there is a previously created piece of path position information (waypoint) which has been created immediately before the new piece of path position information (waypoint) created in step S101, the processing of step S103 is performed.

In this case, in step S103, the data processing unit of the robot 10 creates a connection path that connects the new piece of path position information (waypoint) created in step S101 and the previously created piece of path position information which has been created immediately before, and stores the connection path in the storage unit.

For example, the path is recorded in the map stored in the storage unit.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

The robot 10 moves along this path, that is, the path connecting the pieces of path position information (waypoints).

(Step S104)

When a path has been created in step S103, or when it is determined in step S102 that there is no previously created piece of path position information which has been created immediately before the new piece of path position information (waypoint) created in step S101, the processing of step S104 is performed in these cases.

In step S104, the data processing unit of the robot 10 determines whether or not the target to be followed has moved a predetermined distance (L) from the position at which the new piece of path position information was created.

When the target has not moved, the path is not updated.

When it is determined that the target has moved the predetermined distance (L), the processing returns to step S101 to further perform the processing of creating a new piece of path position information (waypoint) at that movement position, and then the processing of steps S101 to S104 is performed repeatedly.

By the processing performed in this way, as the target moves, a new piece of path position information (waypoint) and a path connecting the pieces of path position information (waypoints) are sequentially created.

The robot 10 can reliably follow the target to be followed by moving along the path connecting the pieces of path position information (waypoints).

2. Configuration Example of Mobile Device (Robot)

Next, a configuration example of a mobile device (robot) will be described.

Figure 4:
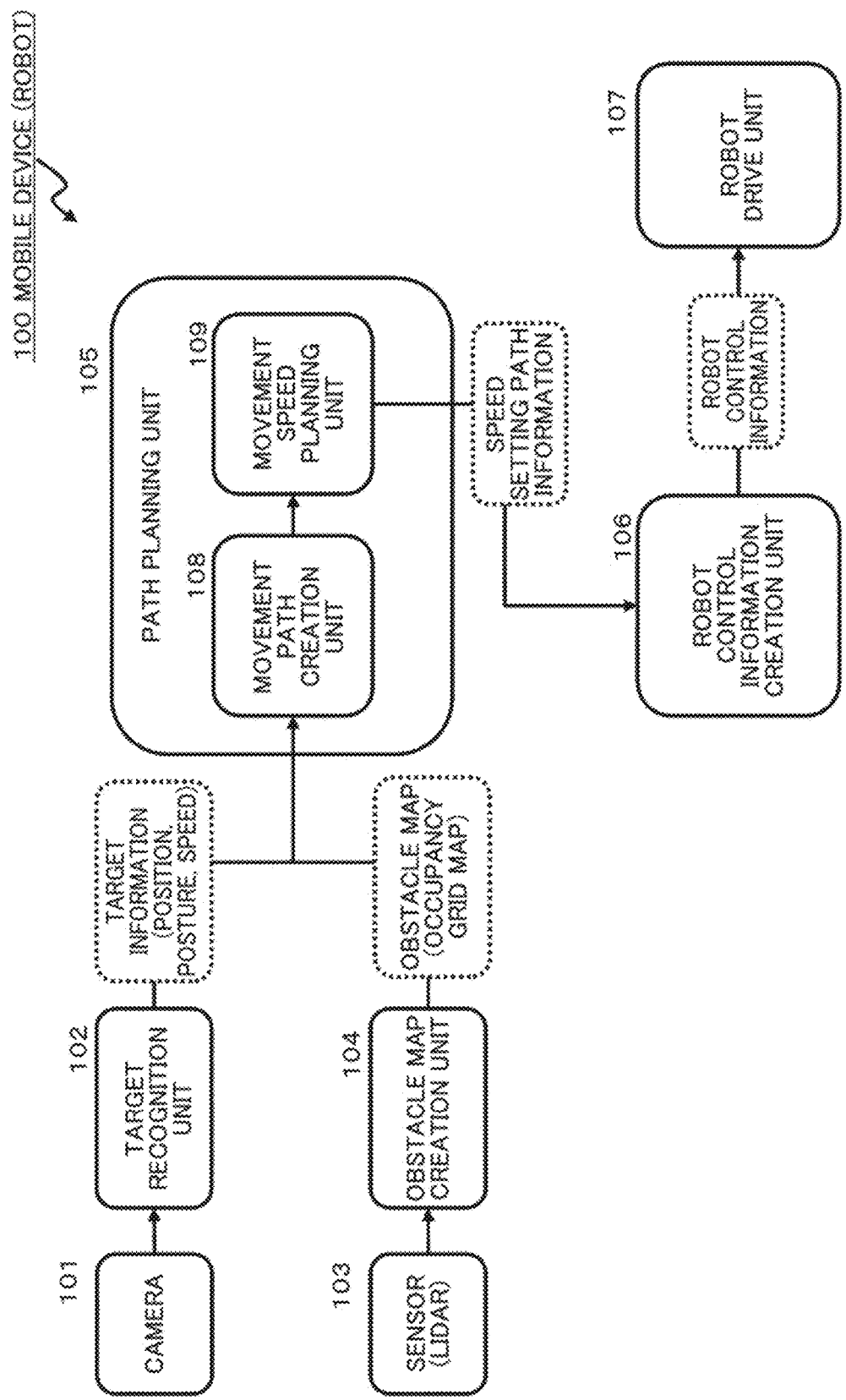
FIG. 4 is a block diagram illustrating a configuration example of a main configuration of a mobile device (robot) according to the present disclosure.

FIG. 4 is a block diagram illustrating a configuration example of a main configuration of a mobile device (robot) 100 according to the present disclosure. As illustrated in FIG. 4, the mobile device (robot) 100 includes a camera 101, a target recognition unit 102, a sensor (LiDAR) 103, an obstacle map creation unit 104, a path planning unit 105, a robot control information creation unit 106, and a robot drive unit 107.

The path planning unit 105 includes a movement path creation unit 108 and a movement speed planning unit 109.

The camera 101 captures an image in the travel direction of the mobile device (robot) 100 and an image of a target to be followed.

The target recognition unit 102 receives the image captured by the camera 101 and identifies the target. The target image is stored in advance in a storage unit (not illustrated), and the target recognition unit 102 compares the target image stored in the storage unit with the image captured by the camera to extract the target from the image captured by the camera, for example.

The target recognition unit 102 analyzes the position, posture, and movement speed of the target extracted from the image captured by the camera, and creates target information including these pieces of information.

The created target information is stored in a storage unit (not illustrated) and output to the path planning unit 105 at the next stage.

The sensor (LiDAR) 103 is an object detection sensor using LiDAR (Light Detection and Ranging, Laser Imaging Detection and Ranging), for example. It measures the distance to an obstacle, for example.

Note that the sensor 103 is not limited to LiDAR, and may be, for example, a stereo camera, a ToF sensor, an ultrasonic sensor, a radar, a sonar, or the like.

The obstacle map creation unit 104 receives detection information from the sensor 103, analyzes the position of an obstacle that exists in the travel direction of the mobile device (robot) 100, and creates an obstacle map. The created obstacle map is stored in a storage unit (not illustrated) and output to the path planning unit 105 at the next stage.

The obstacle map created by the obstacle map creation unit 104 is, for example, an occupancy grid map. The occupancy grid map is a map indicating a robot movement plane, and is a map composed of a large number of rectangular cells partitioned into a grid. It is a map that enables identification of the presence or absence of an obstacle in each rectangular cell. A specific example of the occupancy grid map will be described later.

The path planning unit 105 performs processing of planning the movement path and movement speed for the mobile device (robot) 100.

The path planning unit 105 includes the movement path creation unit 108 and the movement speed planning unit 109.

The movement path creation unit 108 creates a movement path for the mobile device (robot) 100.

The processing of creating a movement path performed by the movement path creation unit 108 corresponds to the processing of creating a piece of path position information (waypoint) and the processing of creating a path connecting the pieces of path position information (waypoints), which are described above with reference to FIGS. 1 and 2.

In other words, the movement path creation unit 108 performs the processing according to the above-described flow illustrated in FIG. 3 to create a movement path for the mobile device (robot) 100.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

The movement speed planning unit 109 determines a movement speed for the mobile device (robot) 100 to move along the movement path created by the movement path creation unit 1.08, that is, the path connecting the pieces of path position information (waypoints).

Thus, the path planning unit 105 determines the movement path and movement speed for the mobile device (robot) 100 to move.

The information on the movement path and movement speed determined by the path planning unit 105 is output to the robot control information creation unit 106.

The robot control information creation unit 106 receives the information on the movement path and movement speed from the path planning unit 105, creates robot control information for moving the mobile device (robot) 100 along the received movement path and with the received movement speed, and outputs the robot control information to the robot drive unit 107.

The robot drive unit 107 drives the mobile device (robot) 100 according to the robot control information received from the robot control information creation unit 106.

In other words, drive processing of moving the mobile device (robot) 100 to follow the target to be followed is performed.

3. Specific Examples of Processing of Creating Path Position Information (Waypoint) and Processing of Creating Path (Movement Path)

Next, specific examples of the processing of creating a piece of path position information (waypoint) and the processing of creating a path (movement path) will be described.

The processing of creating a piece of path position information (waypoint) and the processing of creating a path (movement path) are performed by the movement path creation unit 108 of the path planning unit 105 of the mobile device (robot) 100 illustrated in FIG. 4.

The movement path creation unit 108 of the path planning unit 105 uses the basic algorithm described above with reference to FIGS. 1 to 3, that is, (1) Basic algorithm of target following processing, to perform the processing of creating a piece of path position information (waypoint) and the processing of creating a path (movement path).

The movement path creation unit 108 of the path planning unit 105 further uses a plurality of different algorithms based on this basic algorithm to perform the processing of creating a piece of path position information (waypoint) and the processing of creating a path (movement path).

Each of these algorithms be described below.

The following algorithms will be described in order.

(2) Path position information (waypoint) and path creation algorithm to address a sudden change in direction of the target (3) Path position information (waypoint) and path creation algorithm to address target recognition errors (4) Example 1 of deletion algorithm for path position information (waypoint)

(5) Example 2 of deletion algorithm for path position information (waypoint)

(6) Position correction algorithm for path position information (waypoint)

(2) Path Position Information (Waypoint) and Path Creation Algorithm to Address a Sudden Change in Direction of the Target First, "(2) Path position information (waypoint) and path creation algorithm to address a sudden change in direction of the target" will be described.

Figure 5:
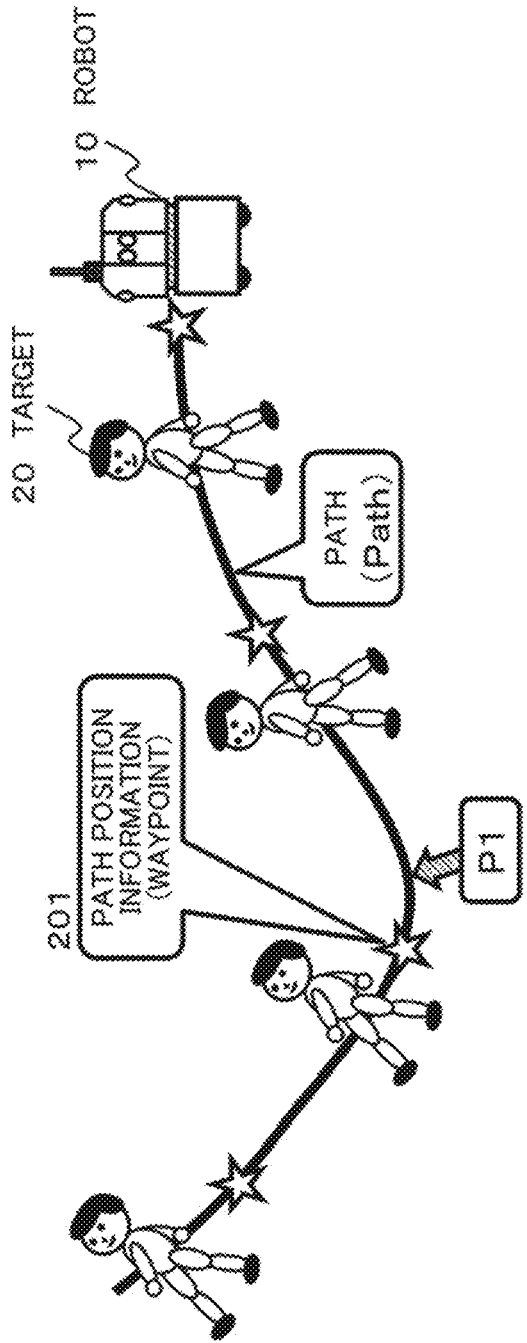
FIG. 5 is a diagram for explaining a problem of a sudden change in direction of the target.

FIG. 5 is a diagram for explaining "(2a) a problem of a sudden change in direction of the target".

Specifically, it is a diagram for explaining a problem that occurs when the target 20 followed by the robot 10 suddenly changes direction.

The robot 10 illustrated in FIG. 5 creates a path to follow the target 20.

This processing of creating a path is achieved by the processing described above with reference to FIGS. 1 to 3, that is, the processing of creating a piece of path position information (waypoint) near the target and the processing of connecting the created pieces of path position information (waypoints).

Specifically, the processing is performed in accordance with the following rule for setting path position information (waypoint).

Rule: Set a new piece of path position information (waypoint) on a circle with a radius Ra centered on the target and at an angular position of a specified angle (for example, 150 degrees counterclockwise) with respect to the travel direction of the target to be followed.

Note that various settings are possible for the angle for a piece of path position information (waypoint) to be set.

A new piece of path position information is set in accordance with the above-mentioned. Rule, and a path is created by the processing of connecting the new piece of path position information and the previously created piece of path position information.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

These pieces of information are recorded, for example, in a map stored in the storage unit inside the robot 10.

However, the target 20 to be followed may make a sudden change in direction.

For example, as illustrated in FIG. 5, the target 20 makes a sudden change in direction at a point, P1.

If the processing of setting a piece of path position information (waypoint) is performed in accordance with the above-mentioned Rule when the target 20 makes such a sudden change in direction, a piece of path position information (waypoint) would always be set behind the target. As a result, the path (following path) connecting the pieces of path position information will become a path that draws a large outer round.

In the embodiment, a piece of path position information (waypoint) is set at 150 degrees counterclockwise with respect to the travel direction of the target. However, the path (following path) may become a path that draws a large outer round for the case of being set at various angles, not limited to 150 degrees.

A change in direction as referred to herein means that a "direction vector" connecting the current position and the past position of the target is updated, and as a result, the "direction vector" changes by a predetermined angular position or more.

Specifically, when the processing of setting a piece of path position information (waypoint) 201 illustrated in FIG. 5 behind the target (at 150 degrees counterclockwise with respect to the travel direction of the target) is performed in accordance with the above-mentioned Rule, consequently, the path (following path) connecting the pieces of path position information becomes a path that draws a large outer round.

If the robot 10 moves along such a path with a large outer round, the robot 10 would have no choice but to travel uselessly.

Figure 6:
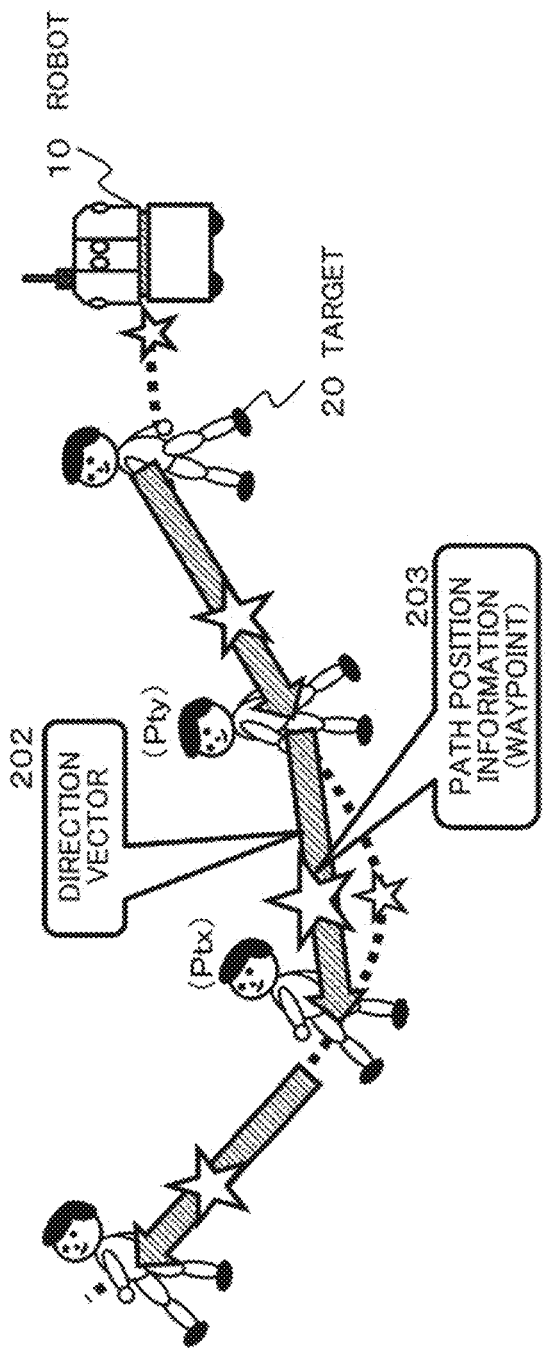
FIG. 6 is a diagram for explaining a solution to the problem of a sudden change in direction of the target.

FIG. 6 is a diagram for explaining processing to resolve such useless travel.

FIG. 6 is a diagram for explaining a solution to "(2b) a problem of a sudden change in direction of the target".

In order to achieve efficient following processing for the target 20 to be followed, the robot 10 according to the present disclosure sets a "direction vector" connecting the current position and the past position of the target 20 as illustrated in FIG. 6, and sets, based on the set "direction vector", a piece of path position information (waypoint) at a position of a predetermined angle.

A path (following path) is configured to connect the pieces of path position information (waypoints) on the "direction vector".

Such processing being performed makes it possible to prevent the following path. from making a large round.

For example, as illustrated in FIG. 6, the current position of the target 20 is set as (Ptx) and the past position is set as (Pty).

A "direction vector 202" connecting the current position (Ptx) and the past position (Pty) of the target 20 is set, and a piece of path position information (waypoint) is set at a position of a predetermined angle with respect to the set "direction vector 202" used as a reference.

A path (following path) is configured to connect the pieces of path position information (waypoints) on the "direction vector".

Such processing being performed makes it possible to prevent the following path from making a large round.

Figure 7:
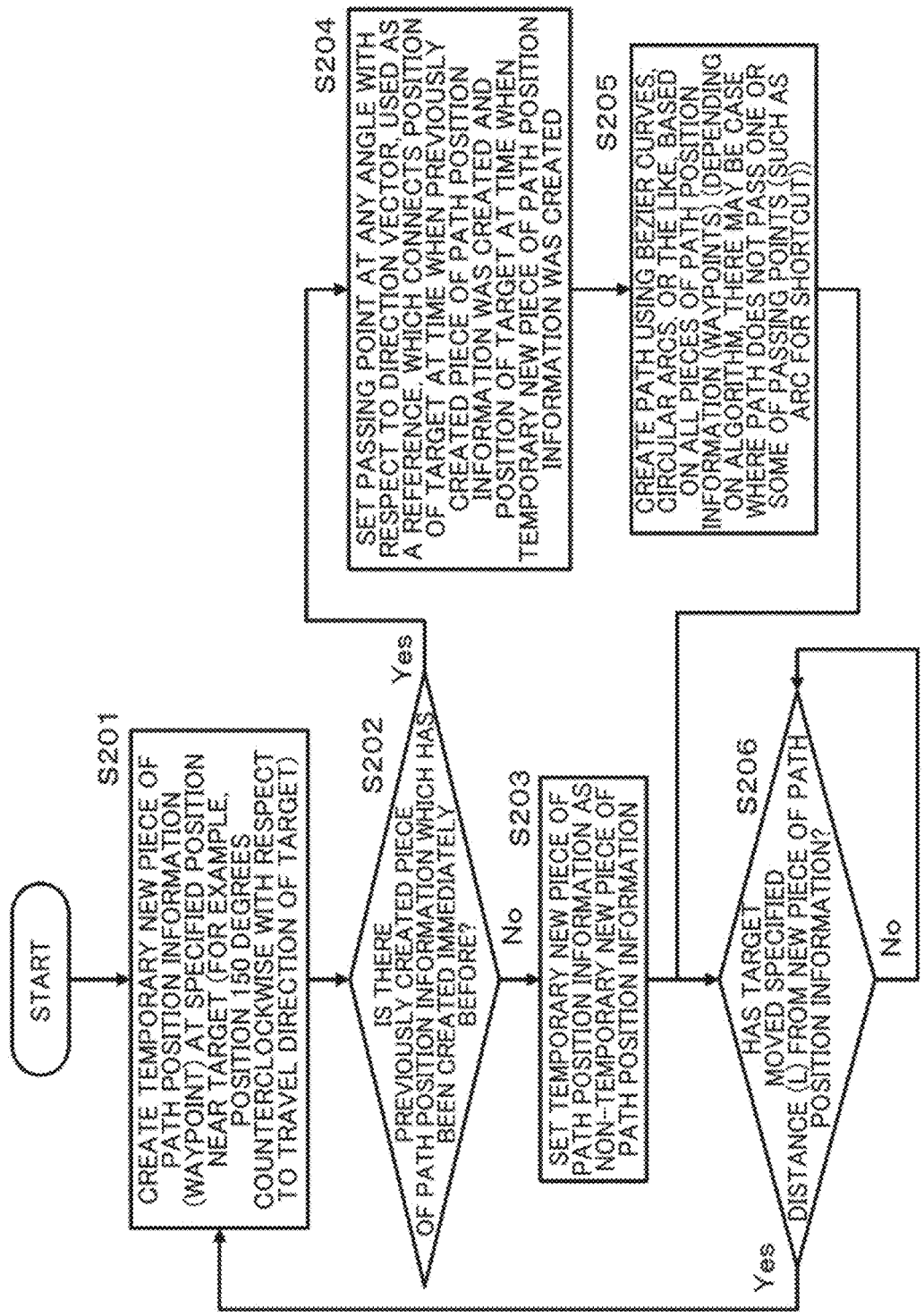
FIG. 7 illustrates a flowchart for explaining the sequence of processing of a piece of path position information (waypoint) and a path creation algorithm to address a sudden change in direction of the target.

This processing algorithm, that is, the sequence of processing of "(2) path position information (waypoint) and path creation algorithm to address a sudden change in direction of the target" will be described with reference to the flowchart illustrated in FIG. 7.

Processing of each step in the flow illustrated in FIG. 7 will be sequentially described below.

(Step S201)

First, in step S201, the data processing unit of the robot 10 creates in accordance with the predetermined Rule a "temporary new piece of path position information (waypoint)" at a specified position near the target to be followed, for example, a position 150 degrees counterclockwise with respect to the travel direction of the target).

Note that various settings are possible for the angle for a piece of path position information (waypoint) to be set.

(Step S202)

Next, in step S202, the data processing unit of the robot 10 determines whether or not there is a previously created piece of path position information (waypoint) which has been created immediately before the "temporary new piece of path position information (waypoint)" created in step S201.

A map in which pieces of path position information (waypoints) are recorded is recorded in the storage unit of the robot 10.

The data processing unit of the robot 10 refers to the map stored in the storage unit and determines whether or not there is a previously created piece of path position information.

When there is a previously created piece of path position information, the processing proceeds to step S204.

On the other hand, when there is no previously created piece of path position information, the processing proceeds to step S203.

(Step S203)

When it is determined in step S202 that there is no previously created piece of path position information which has been created immediately before the new piece of path position information (waypoint) created in step S201, the processing of step S203 is performed.

In this case, in step S203, the data processing unit of the robot 10 sets the "temporary new piece of path position information (waypoint)" created in step S201 as the "non-temporary new piece of path position information (waypoint)".

(Step S204)

On the other hand, in step S202, when it is determined that there is a previously created piece of path position information (waypoint) which has been created immediately before the "temporary new piece of path position information (waypoint)" created in step S201, the processing of step S204 is performed.

In this case, in step S204, the data processing unit of the robot 10 sets a passing point at the position of the predetermined angle with respect to the direction vector, used as a reference, which connects the position of the target at the time when the previously created piece of path position information (waypoint) was created and the position of the target at the time when the temporary new piece of path position information was created.

This processing corresponds to, for example, the processing of creating the piece of path position information (waypoint) 203 on the direction vector 202 illustrated in FIG. 6.

(Step S205)

Next, in step S205, the data processing unit of the robot 10 creates a path using Bezier curves, circular arcs, or the like, based on all pieces of path position information (waypoints). Depending on the algorithm, there may be a case where the path does not pass one or some of the passing points (such as an arc for shortcut)).

The created connection path is stored in the storage unit.

For example, the path is recorded in the map stored in the storage unit.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

The robot 10 moves along this path, that is, the path connecting the pieces of path position information (waypoints).

(Step S206)

When a path has been created in step S205, or when the processing of setting the "temporary new piece of path position. information (waypoint)" created in step S201 as the "non-temporary new piece of path position information (waypoint)" has been performed in step S203, the processing of step S206 is performed in these cases.

In step S206, the data processing unit of the robot 10 determines whether or not the target to be followed has moved a predetermined distance (L) from the position at which the non-temporary new piece of path position information was created.

When the target has not moved, the path is not updated.

When it is determined that the target has moved the predetermined distance (L), the processing returns to step S201 to further perform the processing of creating a new piece of path position information (waypoint) at that movement position, and then the processing of steps S201 to S206 is performed repeatedly.

By the processing performed in this way, as the target moves, a path connecting the pieces of path position information (waypoints), which are set on the direction vector created based on the position of the target, is sequentially created.

The robot 10 can reliably and efficiently follow the target to be followed by moving along the path connecting the pieces of path position information (waypoints) on that direction vector.

The path creation algorithm that prevents the path from making a large round is not limited to the processing of setting a piece of path position information (waypoint) behind the target in accordance with the above-mentioned Rule, and can be used for a case where a parallel path is created to follow the target at a certain distance away from the target, for example.

Figure 8:
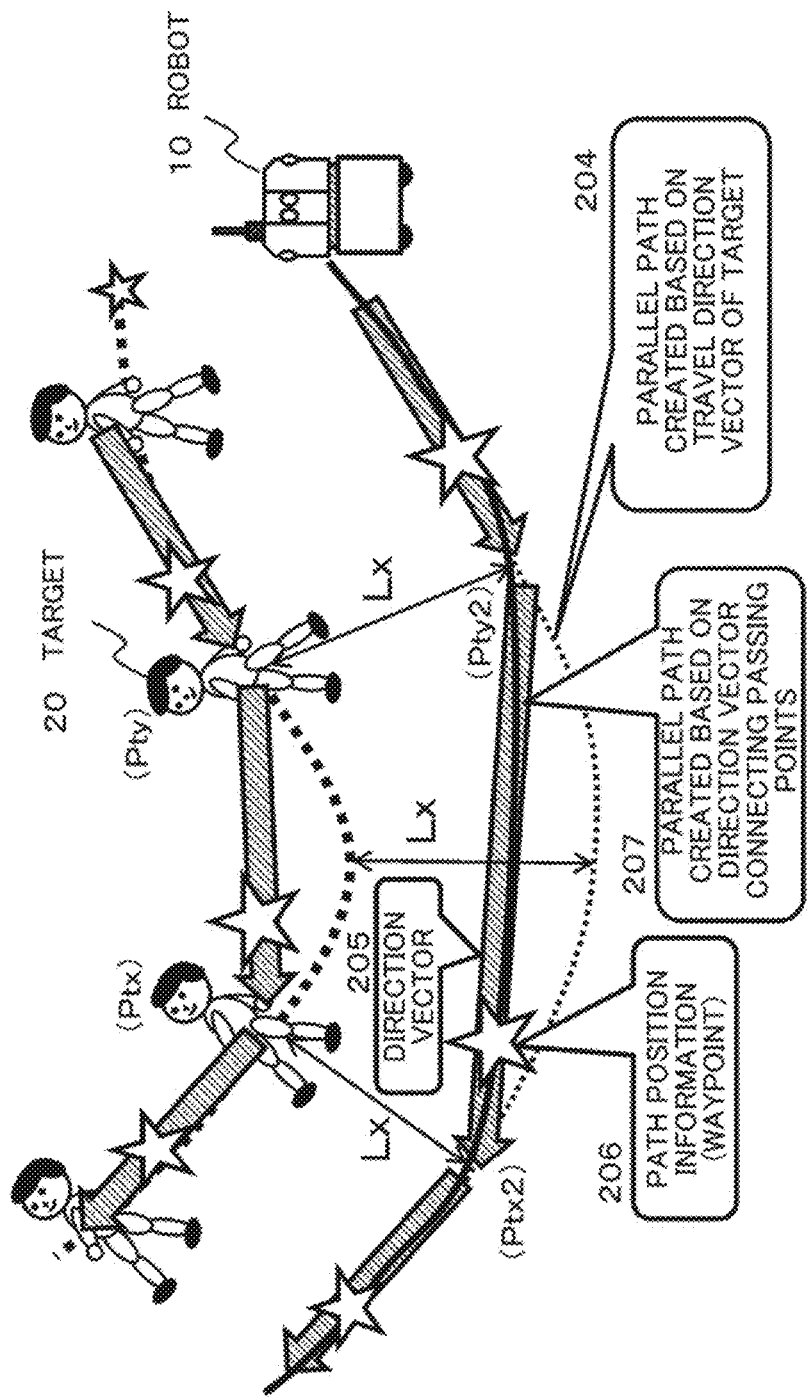
FIG. 8 is a diagram for explaining a solution to the problem of a sudden change in direction of the target.

For example, as illustrated in FIG. 8, in the case where a parallel path is created to follow the target 20 at a certain distance (Lx) away from the target 20, the data processing unit of the robot 10 first sets the angle to be set for the piece of path position information (waypoint) to 90 degrees with respect to the travel direction of the target. A path is created using the pieces of path position information (waypoints) created by such individual settings, so that a parallel path at a certain distance away from the target is created.

By such processing being performed, a parallel path that runs parallel to the movement of the target 20 is created as illustrated in FIG. 8. FIG. 8 also illustrates a "parallel path 204 created based on the travel direction vector of the target", a "direction vector 205" connecting the current parallel position (Ptx2) and the past parallel position (Pty2), a "piece of path position information (waypoint) 206" on the "direction vector 205", and a "parallel path created based on the direction vector connecting the passing points".

Such processing being performed can make a parallel movement in which the following path is prevented from making a large round.

(3) Path Position Information (Waypoint) and Path Creation Algorithm to Address Target Recognition Errors Next, "(3) Path position information (waypoint) and path creation algorithm to address target recognition errors" will be described.

Figure 9:
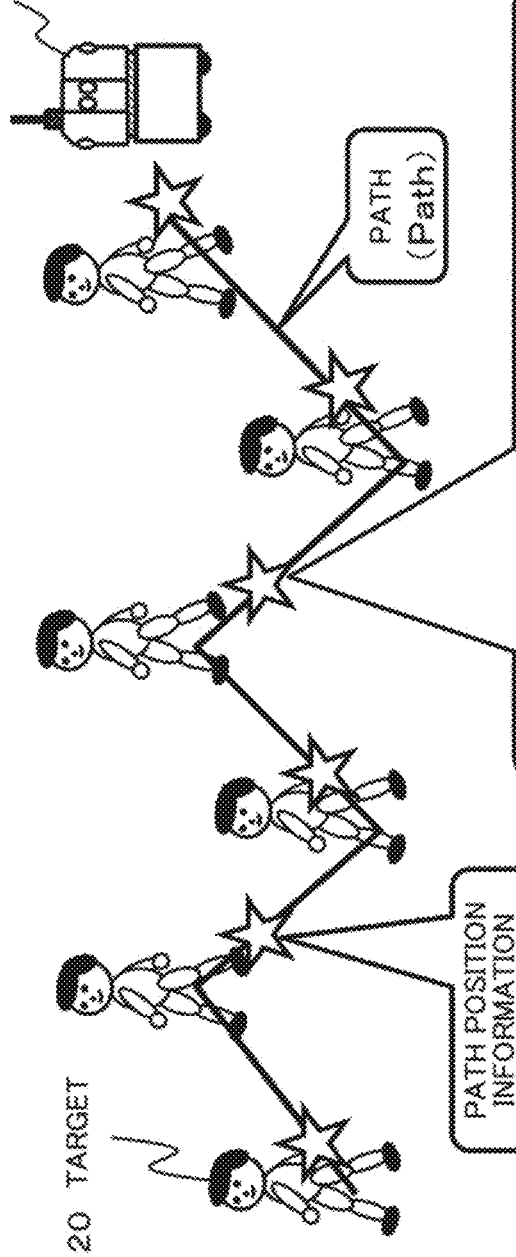
FIG. 9 is a diagram for explaining a problem in follow-up due to target recognition errors.

FIG. 9 is a diagram for explaining "(3a) a problem in follow-up due to target recognition errors".

Specifically, it is a diagram for explaining a problem that occurs when the position of the target 20 to be followed by the robot 10 cannot be recognized with high accuracy.

The robot 10 illustrated in FIG. 9 creates a path to follow the target 20.

This processing of creating a path is achieved by the processing described above with reference to FIGS. 1 to 3, that is, the processing of creating a piece of path position information (waypoint) near the target and the processing of connecting the created pieces of path position information (waypoints).

Specifically, the processing is performed in accordance with the following rule for setting path position information (waypoint).

Rule: Set a new piece of path position information (waypoint) on a circle with a radius Ra centered on the target and at an angular position of a specified angle (for example, 150 degrees counterclockwise) with respect to the travel direction of the target to be followed.

Note that various settings are possible for the angle for a piece of path position information (waypoint) to be set.

A new piece of path position information is set in accordance with the above-mentioned Rule, and a path is created by the processing of connecting the new piece of path position information and the previously created piece of path position information.

These pieces of information are recorded, for example, in a map stored in the storage unit inside the robot 10.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

However, the target 20 to be followed may travel while swaying from side to side as illustrated in FIG. 9, for example.

When the target 20 travels while swaying from side to side, the position of the target is not be recognized with high accuracy in some cases. In such a case, if the processing of setting a piece of path position information (waypoint) in accordance with the above-mentioned Rule is performed, a zigzag following path would be set as illustrated in FIG. 9.

If a path that requires frequent changes in direction is set for follow-up, the efficiency in follow-up will be degraded.

Figure 10:
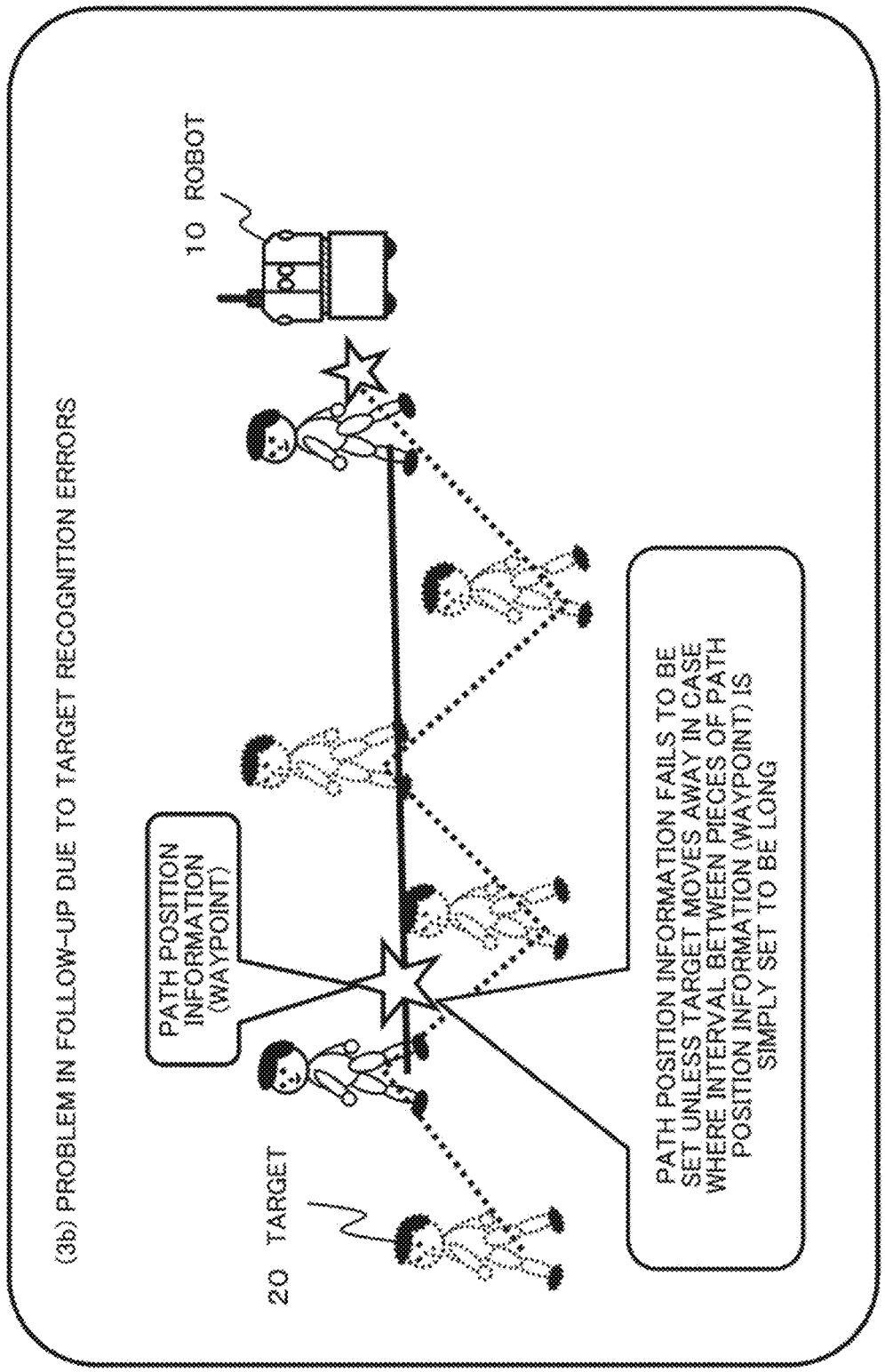
FIG. 10 is a diagram for explaining a problem in follow-up due to target recognition errors.

As one method for solving such a problem, there is a method of setting a long interval at which a piece of path position information (waypoint) is to be set. For example, as illustrated in FIG. 10, a long interval at which a piece of path position information (waypoint) is to be set makes it possible to straighten a zigzag path to some extent.

However, if a long interval at which a piece of path position information (waypoint) is to be set is simply set in this way, there would occur a problem that the next piece of path position information (waypoint) or a path cannot be set unless the target 20 moves away from the setting point for the piece of path position information (waypoint) to some extent.

Figure 11:
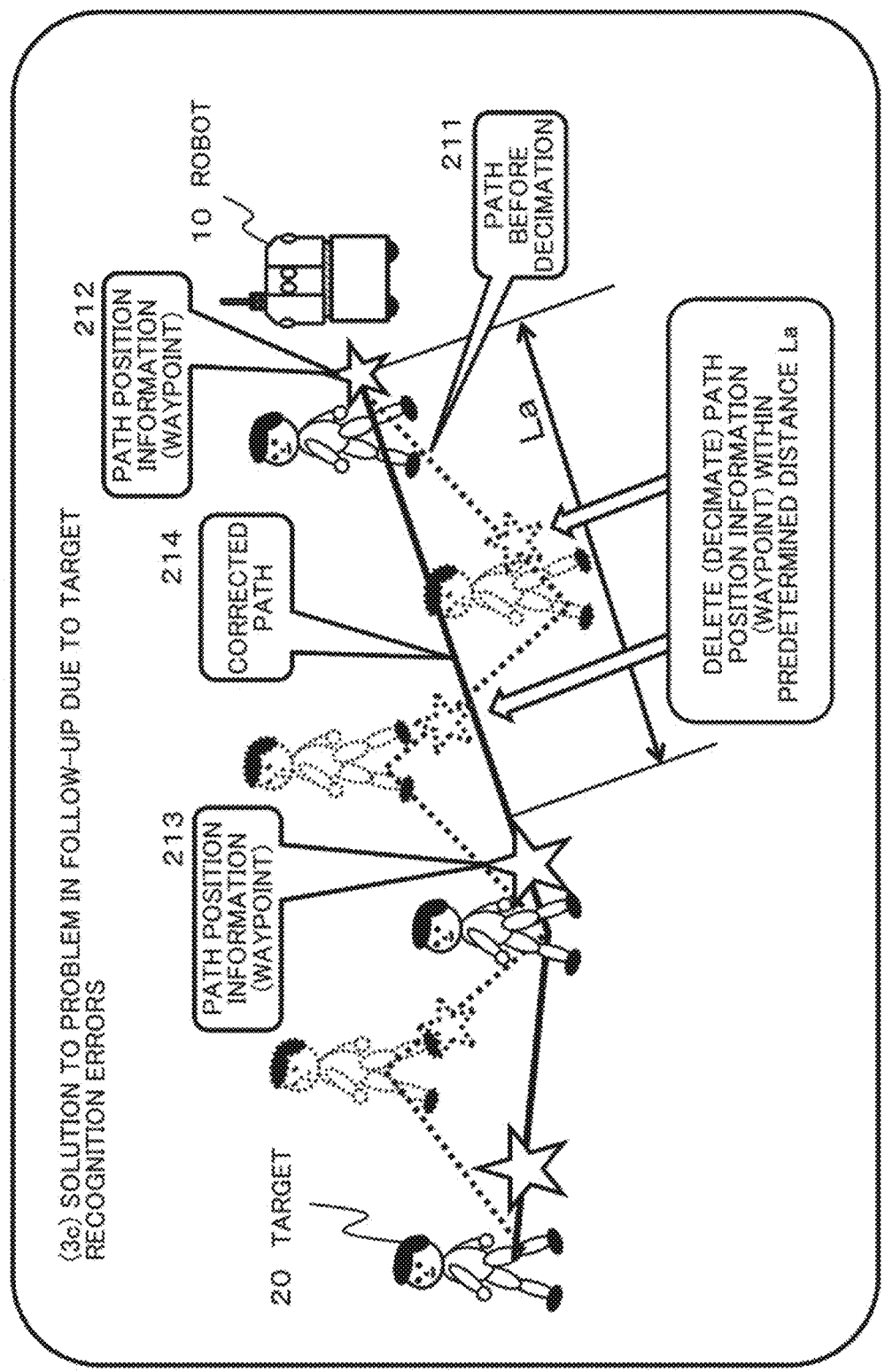
FIG. 11 is a diagram for explaining a solution to the problem in follow-up due to target recognition errors.

FIG. 11 illustrates a method for solving such a problem.

FIG. 11 is a diagram for explaining a solution to "(3c) a problem in follow-up due to target recognition errors".

The robot 10 according to the present disclosure performs the processing illustrated in FIG. 11 in order to realize efficient following processing to address errors in recognizing the target 20 to be followed.

First, the data processing unit of the robot 10 according to the present disclosure performs the processing according to the basic algorithm described above with reference to FIGS. 1 to 3, that is, the processing in accordance with the following setting rule for path position information (waypoint).

Rule: Set a new piece of path position information (waypoint) on a circle with a radius Ra centered on the target and at an angular position of a specified angle (for example, 150 degrees counterclockwise) with respect to the travel direction of the target to be followed.

Note that various settings are possible for the angle for a piece of path position information (waypoint) to be set.

A new piece of path position information is set in accordance with the above-mentioned Rule, and a path is created by the processing of connecting the new piece of path position information and the previously created piece of path position information.

By this processing, a path 211 before decimation as illustrated in FIG. 11 is created.

However, the path 211 before decimation is a zigzag path, as described above with reference to FIG. 9, resulting in poor follow-up efficiency.

Next, the data processing unit of the robot 10 according to the present disclosure performs processing of deleting some of the pieces of path position information (waypoints).

Specifically, as illustrated in FIG. 11, among the pieces of path position information (waypoints) on the path 211 before decimation, two pieces of path position information (waypoints) whose interval is a predetermined specified distance (La) or longer are sequentially selected, and a piece or pieces of path position information (waypoints) between the selected two pieces of path position information (waypoints) is or are deleted.

In the example illustrated in FIG. 11, a piece of path position information (waypoint) 212 and a piece of path position information (waypoint) 213 are the two pieces path position information (waypoints) that are at a predetermined specified distance (La) or longer away from each other, and pieces of path position information (waypoints) between the pieces of path position information (waypoints) 212 and 213 are deleted.

After the processing of deleting pieces of path position information (waypoints), the remaining pieces of path position information (waypoints) are connected to create a path, which is a following path for the robot.

By this processing, a corrected path 214 before decimation as illustrated in FIG. 11 is created.

The information on this corrected path is recorded, for example, in a map stored in the storage unit inside the robot 10, and the robot 10 follows the target 20 along the corrected path 214.

By such processing being performed, it is possible to create an efficient following path even when an error in recognizing the target 20 occurs.

Figure 12:
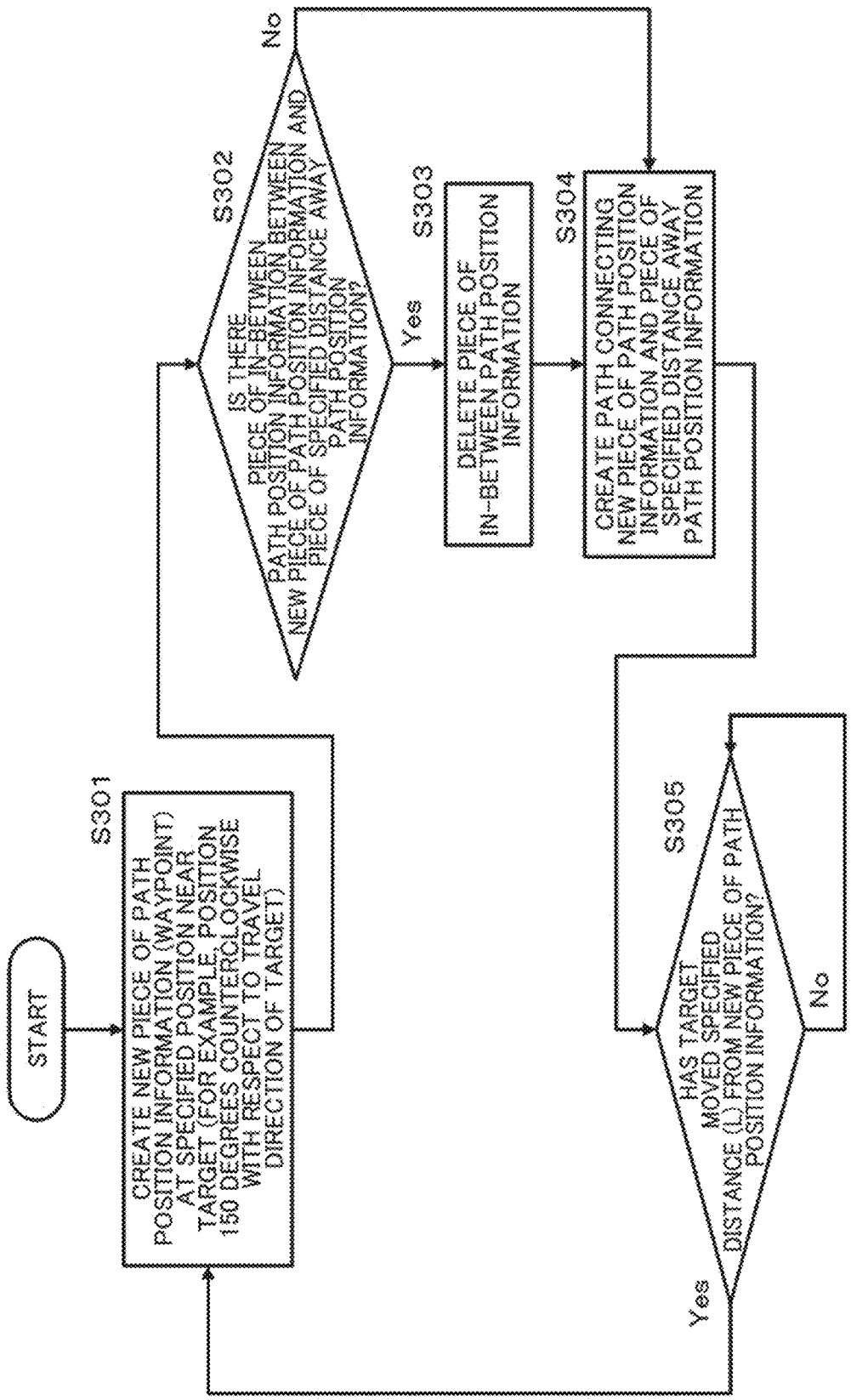
FIG. 12 illustrates a flowchart for explaining the sequence of processing of pieces of path position information (waypoints) and a path creation algorithm to address target recognition errors.

This processing algorithm, that is, the sequence of processing of "(3) Path position information (waypoint) and path creation algorithm to address target recognition errors" will be described with reference to the flowchart illustrated in FIG. 12. Processing of each step in the flow illustrated in FIG. 12 will be sequentially described below.

(Step S301)

First, in step S301, the data processing unit of the robot 10 creates in accordance with the predetermined Rule a "new piece of path position information (waypoint)" at a specified position near the target to be followed, for example, a position 150 degrees counterclockwise with respect to the travel direction of the target).

Note that various settings are possible for the angle for a piece of path position information (waypoint) to be set.

(Step S302)

Next in step S302, the data processing unit of the robot 10 determines whether or not there is a created piece of path position information between "the new piece of path position information (waypoint)" created in step S301 and a "piece of specified distance away path position information", that is, a "piece of in-between. path position information".

When there is a "piece of in-between path position information", the processing proceeds to step S303.

Otherwise, the processing proceeds to step S304.

(Step S303)

Next, when it is determined in step S302 that there is a created piece of path position information between "the new piece of path position information (waypoint)" created in step S301 and a "piece of specified distance away path position information", that is, a "piece of in-between path position information", the data processing unit of the robot 10 performs processing of deleting the "piece of in-between path position information" in step S303.

(Step S304)

The processing of step S304 is performed when the processing of deleting the "piece of in-between path position information" has been performed in step S303 or when a "piece of in-between path position information" is not detected in step S302.

In these cases, the data processing unit of the robot 10 creates a path connecting the "new piece of path position information (waypoint)" and the "piece of specified distance away path position information" in step S304.

(Step S305)

The processing of step S305 is performed when the path creation has been performed in step S304.

In step S305, the data processing unit of the robot 10 determines whether or not the target to be followed has moved a predetermined distance (L) from the position at which the new piece of path position information was created.

When the target has not moved, the path is not updated.

When it is determined that the target has moved the predetermined distance (L), the processing returns to step S301 to further perform the processing of creating a new piece of path position information (waypoint) at that movement position, and then the processing of steps S301 to S305 is performed repeatedly.

By the processing performed in this way, as the target moves, a path connecting the "new piece of path position information (waypoint)" and the "piece of specified distance away path position information" which are at a predetermined distance (La) or longer from each other is sequentially created.

The robot 10 can reliably and efficiently follow the target to be followed by moving along the path connecting the pieces of path position information (waypoints).

(4) Example 1 of Deletion Algorithm for Path Position Information (Waypoint)

Next, "(4) Example 1 of deletion algorithm for path position information (waypoint)" will be described.

Figure 13:
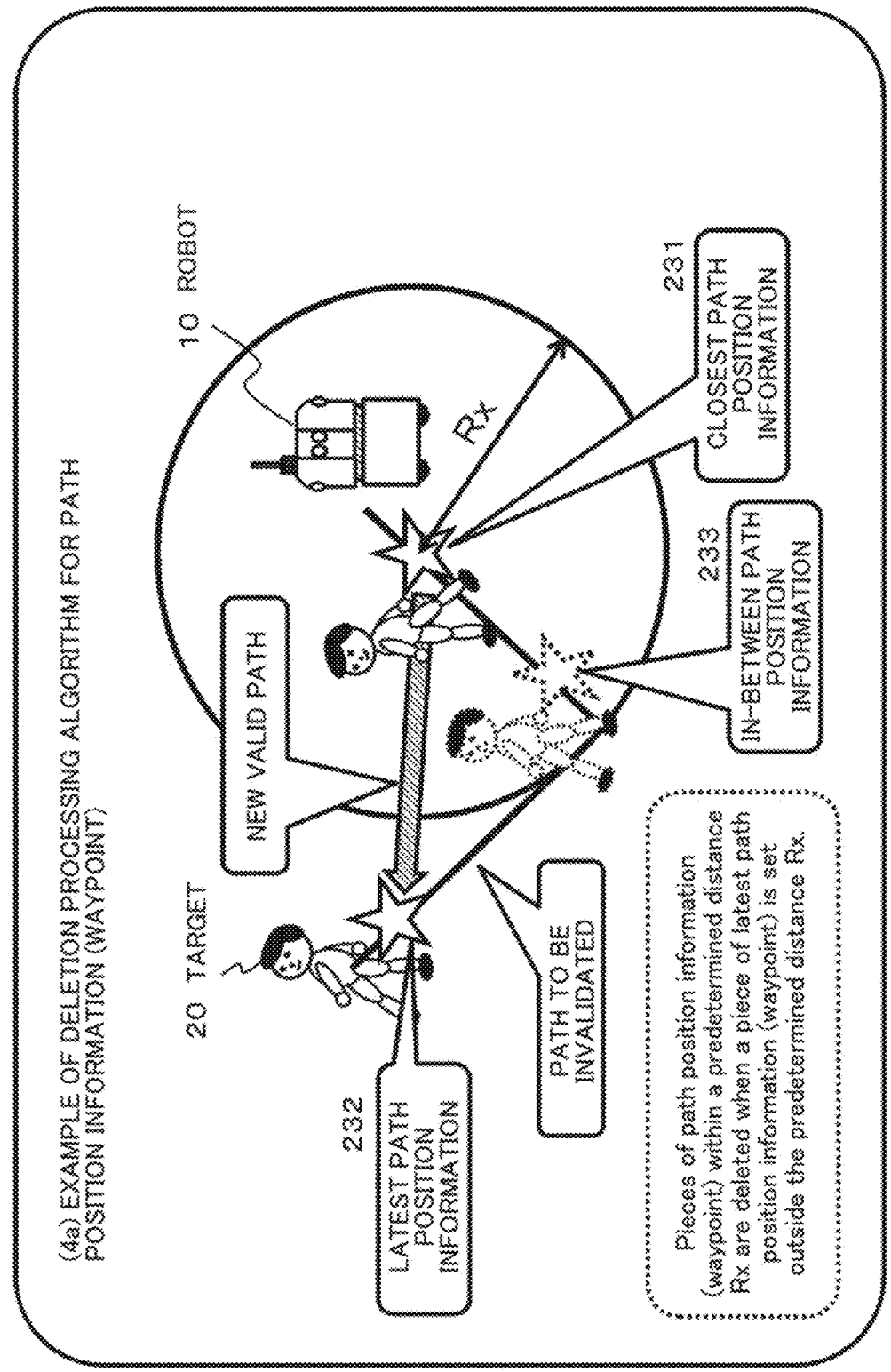
FIG. 13 is a diagram for explaining an example of a deletion processing algorithm for path position information (waypoint).

FIG. 13 is a diagram for explaining "(4a) an example of deletion processing algorithm for path position information (waypoint)".

Specifically, it is a diagram for explaining an example of processing of deleting a piece of path position information (waypoint) created by the robot 10.

The robot 10 illustrated in FIG. 13 creates a path to follow the target 20.

This processing of creating a path is achieved by the processing described above with reference to FIGS. 1 to 3, that is, the processing of creating a piece of path position information (waypoint) near the target and the processing of connecting the created pieces of path position information (waypoints).

Specifically, the processing is performed in accordance with the following rule for setting path position information (waypoint).

Rule: Set a new piece of path position information (waypoint) on a circle with a radius Ra centered on the target and at an angular position of a specified angle (for example, 150 degrees counterclockwise) with respect to the travel direction of the target to be followed.

Note that various settings are possible for the angle for a piece of path position information (waypoint) to be set.

A new piece of path position information is set in accordance with the above-mentioned Rule, and a path is created by the processing of connecting the new piece of path position information and the previously created piece of path position information.

These pieces of information are recorded, for example, in a map stored in the storage unit inside the robot 10.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

However, if the target 20 to be followed travels while swaying from side to side as illustrated in FIG. 9 and thus the position of the target cannot be recognized with high accuracy, the processing of deleting a created piece of path position information (waypoint) would be performed as described above with reference to FIGS. 9 to 12.

An example of an algorithm that is applied when the processing of deleting a created piece of path position information (waypoint) will be described below. In the case where a "piece of latest path position information 232" is set outside a predetermined distance (Rx) from a "piece of closest path position information 231", which is a piece of path position information (waypoint) closest to the robot 10, "(4a) Example of deletion processing algorithm for path position information (waypoint)" illustrated in FIG. 13 is an algorithm for deleting a "piece of in-between path position information 233" between the "piece of closest path position information 231" and the "piece of latest path position information 232".

This processing of deleting the "piece of in-between path position information 233" invalidates the path passing through the "piece of in-between path position information 233", and then a new path that directly connects the "piece of closest path position information 231" and the "piece of latest path position information 232" which is outside the specified distance (Rx) is set.

The robot 10 follows the target 20 along this new bus.

Next, with reference to FIGS. 14 to 16, a deletion processing sequence of the path position information (waypoint) with the target 20 traveling will be described.

Figure 14:
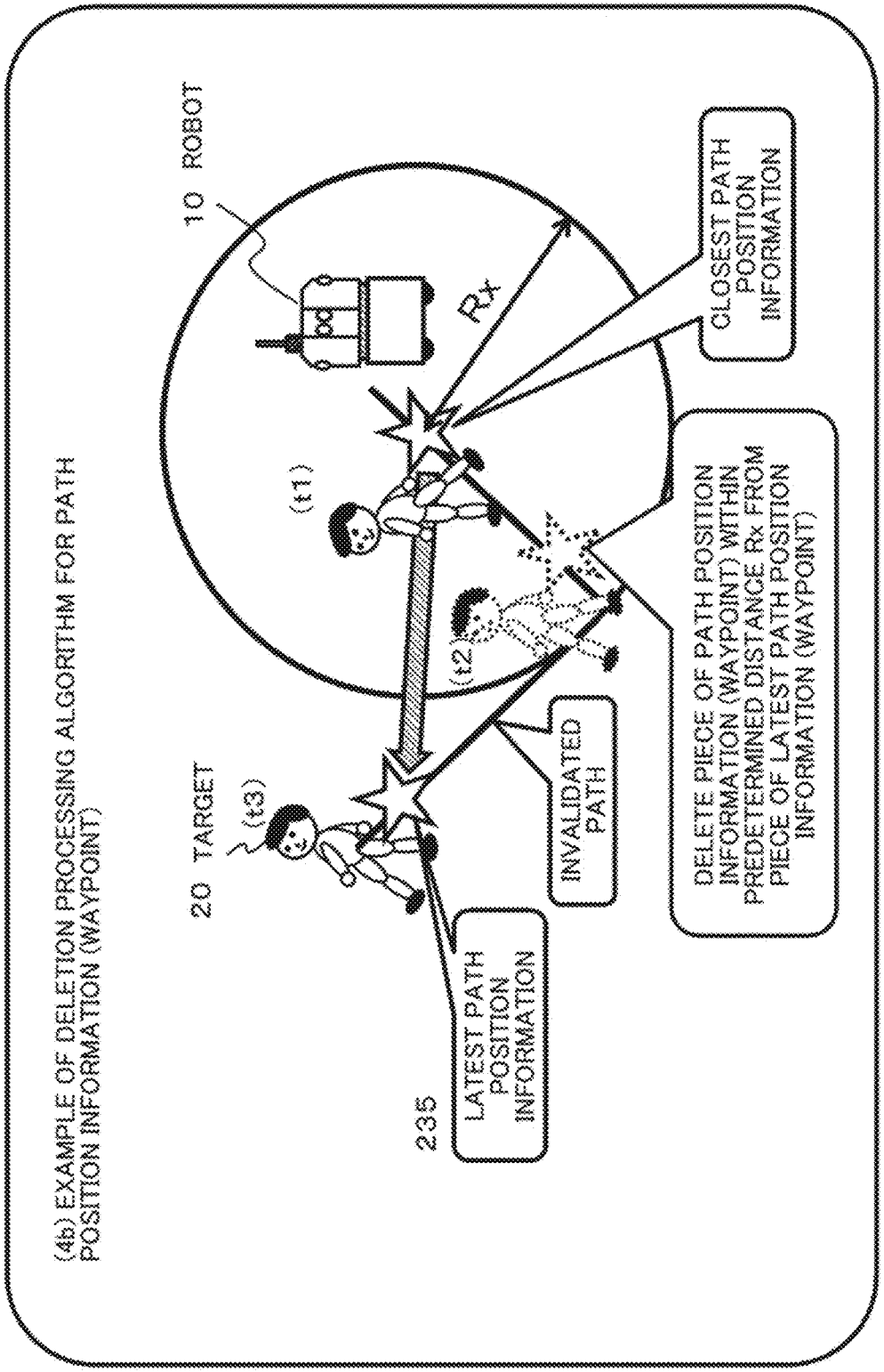
FIG. 14 is a diagram for explaining an example of a deletion processing algorithm for path position information (waypoint).

FIG. 14 illustrates a movement path of the target 20 over time (t1 to t3) and a piece of latest path position information (waypoint) 235 created based on the position of the target 20 at the time (t3).

Figure 15:
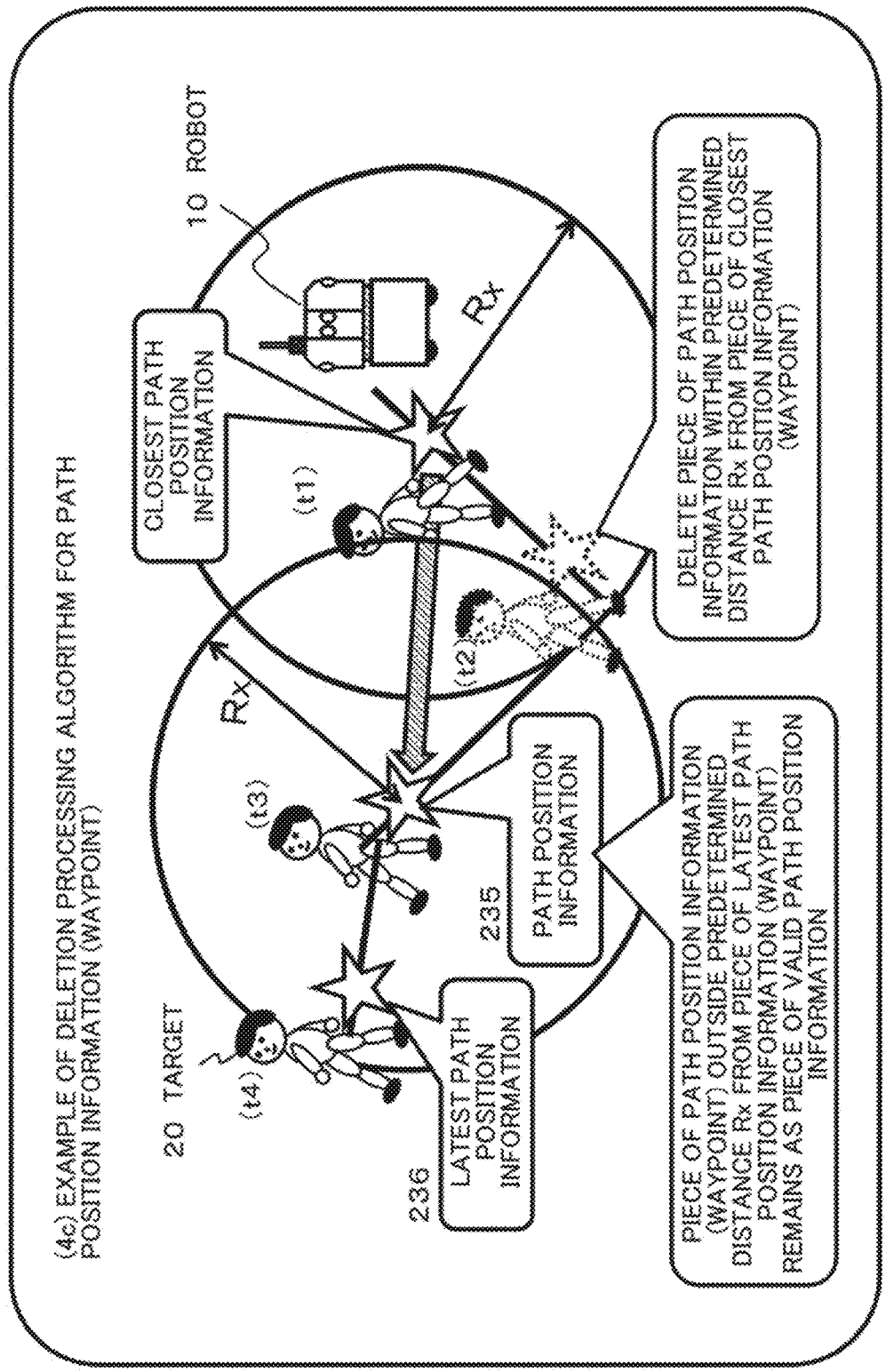
FIG. 15 is a diagram for explaining an example of a deletion processing algorithm for path position information (waypoint).

FIG. 15 illustrates the piece of path position information (waypoint) 235 created based on the target position at the time (t3) illustrated in FIG. 14, the target 20 at a time (t4) after the time (t3), and a piece of latest path position information (waypoint) 236 created based on the position of the target 20 at the time (t4).

The piece of latest path position information (waypoint) 236 is at a distance from the piece of path position information (waypoint) 235 created based on the target position at the time (t3). The distance is within the specified distance (Rx) used as a threshold value for the deletion determination.

In this case, the data processing unit of the robot 10 does not delete the piece of latest path position information (waypoint) 236 created based on the target 20 at the time (t4).

Figure 16:
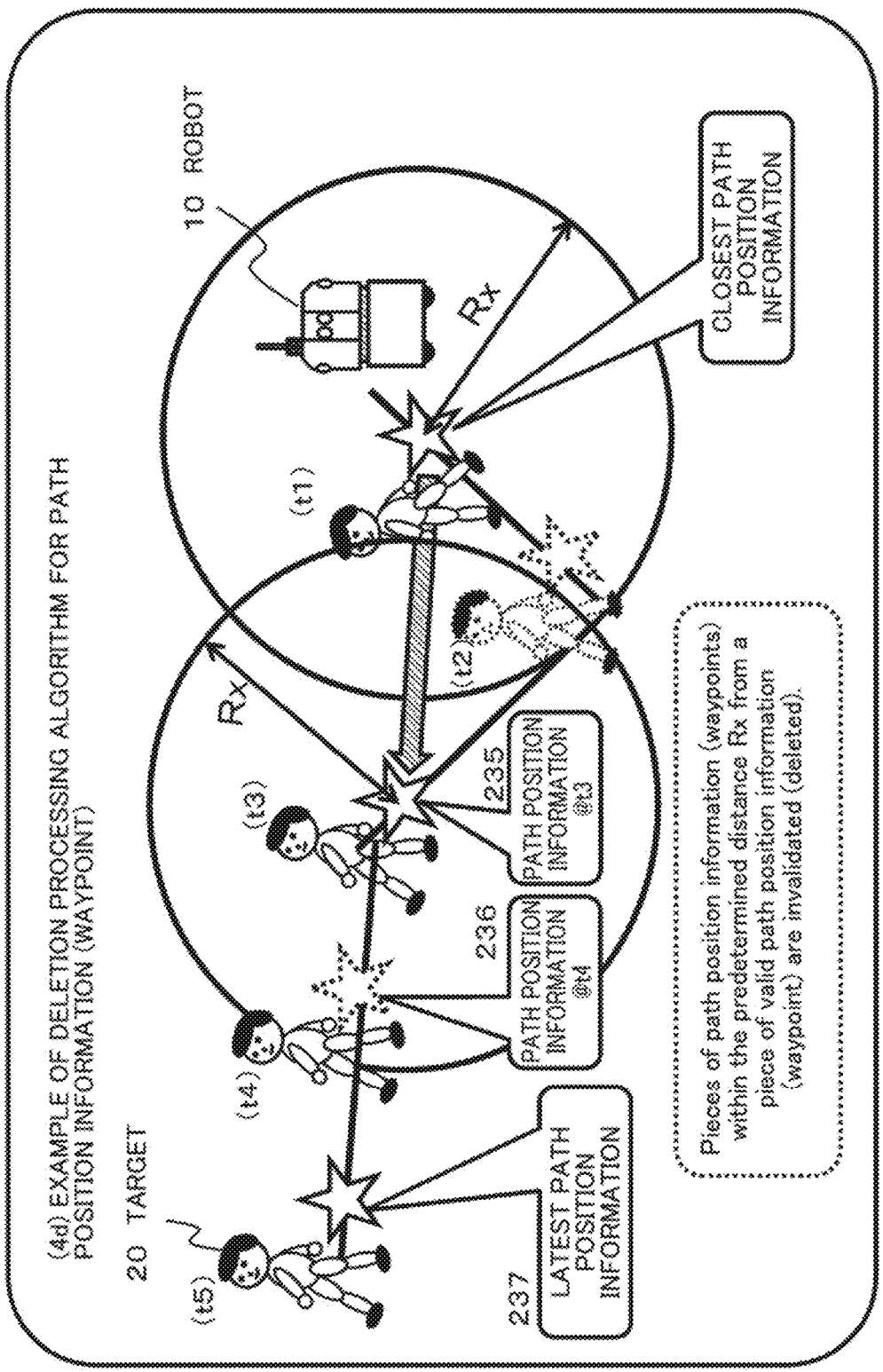
FIG. 16 is a diagram for explaining an example of a deletion processing algorithm for path position information (waypoint).

Next FIG. 16 illustrates the target 20 at a time (t5) after a further period of time has elapsed from the state of FIG.

15 and a piece of latest path position information (waypoint) 237 created based on the position of the target 20 at the time (t5).

The piece of latest path position information (waypoint) 237 illustrated in FIG. 16 is at a distance from the piece of path position information @t3, 235 created based on the target position at the time (t3). The distance is outside the specified distance (Rx) used as a threshold value for the deletion determination.

The piece of path position information @t4, 236 created based on the target position at the time (t4) is between the piece of path position information @t3, 235 created based on the target position at the time (t3) and the piece of latest path position information (waypoint) 237.

In this case, the data processing unit of the robot 10 deletes the piece of path position information @t4, 236 created based on the target 20 at the time (t4).

Specifically, when there is a created piece of path position information outside the specified distance (Rx) from the piece of latest path position information (waypoint), the data processing unit of the robot 10 performs the processing of deleting the piece(s) of in-between path position information between the piece of latest path position information (waypoint) and the piece of path position information which is outside the specified distance (Rx).

The data processing unit of the robot 10 further invalidates the path(s) that pass through the deleted piece(s) of in-between path position information, and sets a path that directly connect the remaining pieces of path position information (waypoints) as a valid path.

The robot 10 travels along this new valid path.

Figure 17:
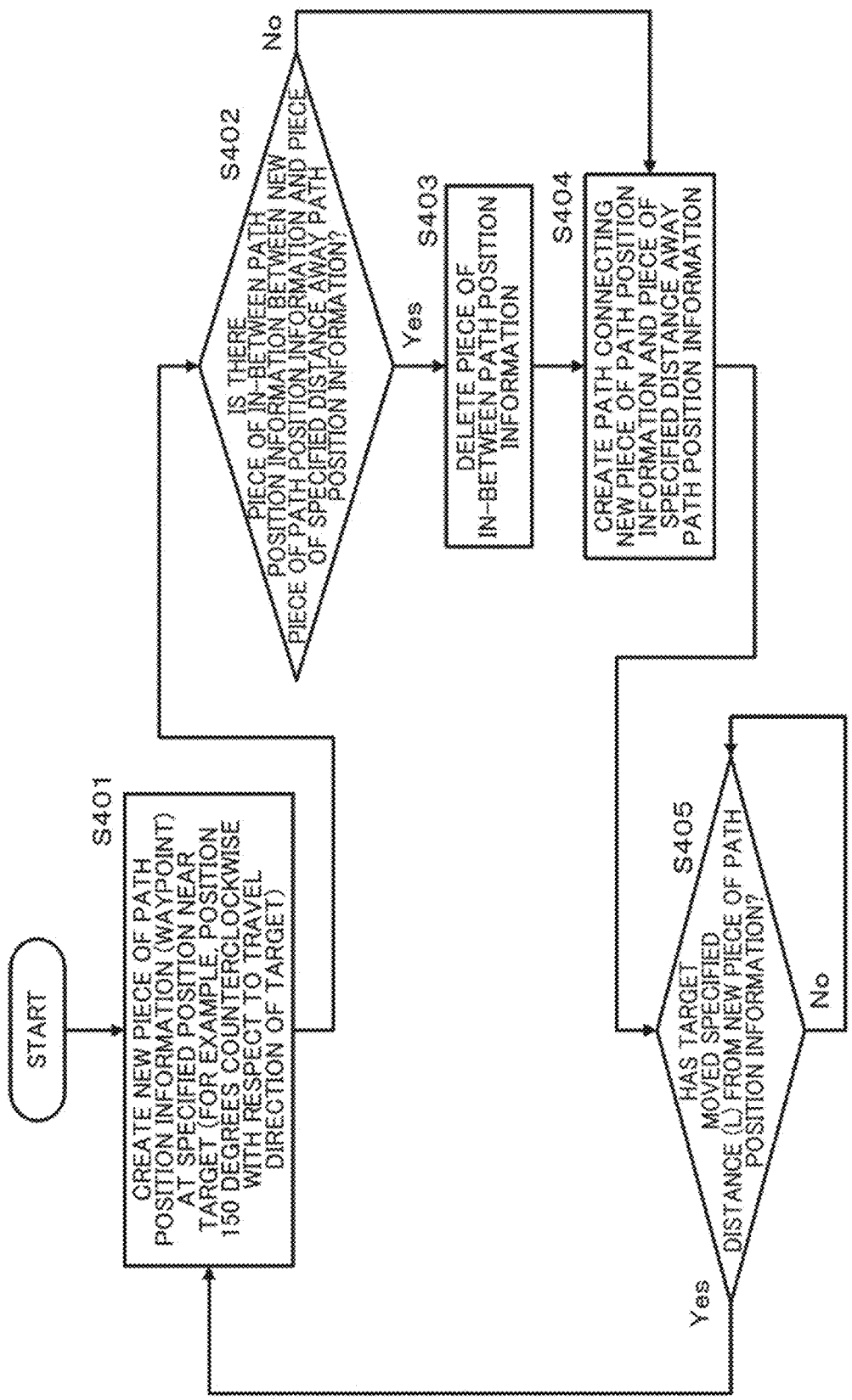
FIG. 17 illustrates a flowchart for explaining the processing sequence of a deletion processing algorithm for path position information (waypoints).

This processing algorithm, that is, the sequence of processing of "(4) Example 1 of deletion algorithm for path position information (waypoint)" will be described with reference to the flowchart illustrated in FIG. 17.

Processing of each step in the flow illustrated in FIG. 17 will be sequentially described below.

(Step S401)

First, in step S401, the data processing unit of the robot 10 creates in accordance with the predetermined Rule a "new piece of path position information (waypoint)" at a specified position near the target to be followed, for example, a position 150 degrees counterclockwise with respect to the travel direction of the target).

Note that various settings are possible for the angle for a piece of path position information (waypoint) to be set.

(Step S402)

Next, in step S402, the data processing unit of the robot 10 determines whether or not there is a created piece of path position information between "the new piece of path position information (waypoint)" created in step S401 and a "piece of specified distance away path position information", that is, a "piece of in-between path position information".

When there is a "piece of in-between path position information", the processing proceeds to step S403.

Otherwise, the processing proceeds to step S404.

(Step S403)

Next, when it is determined in step S402 that there is a created piece of path position information between "the new piece of path position information (waypoint)" created in step S401 and a "piece of specified distance away path position information", that is, a "piece of in-between path position information", the data processing unit of the robot 10 performs processing of deleting the "piece of in-between path position information" in step S403.

(Step S404)

The processing of step S404 is performed when the processing of deleting the "piece of in-between path position information" has been performed in step S403 or when a "piece of in-between path position information" is not detected in step S402.

In these cases, the data processing unit of the robot 10 creates a path connecting the "new piece of path position information (waypoint)" and the "piece of specified distance away path position information" in step S404.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

(Step S405)

The processing of step S405 is performed when the path creation has been performed in step S404.

In step S405, the data processing unit of the robot 10 determines whether or not the target to be followed has moved a predetermined distance (L) from the position at which the new piece of path position information was created.

When the target has not moved, the path is not updated.

When it is determined that the target has moved the predetermined distance (L), the processing returns to step S401 to further perform the processing of creating a new piece of path position information (waypoint) at that movement position, and then the processing of steps S401 to S405 is performed repeatedly.

By the processing performed in this way, as the target moves, a path connecting the "new piece of path position information (waypoint)" and the "piece of specified distance away path position information" which are at a predetermined distance (Rx) or longer from each other is sequentially created.

The robot 10 can reliably and efficiently follow the target, to be followed by moving along the path connecting the pieces of path position information (waypoints).

(5) Example 2 of Deletion Algorithm for Path Position Information (Waypoint)

Next, "(5) Example 2 of deletion algorithm for path position information (waypoint)" will be described.

Figure 18:
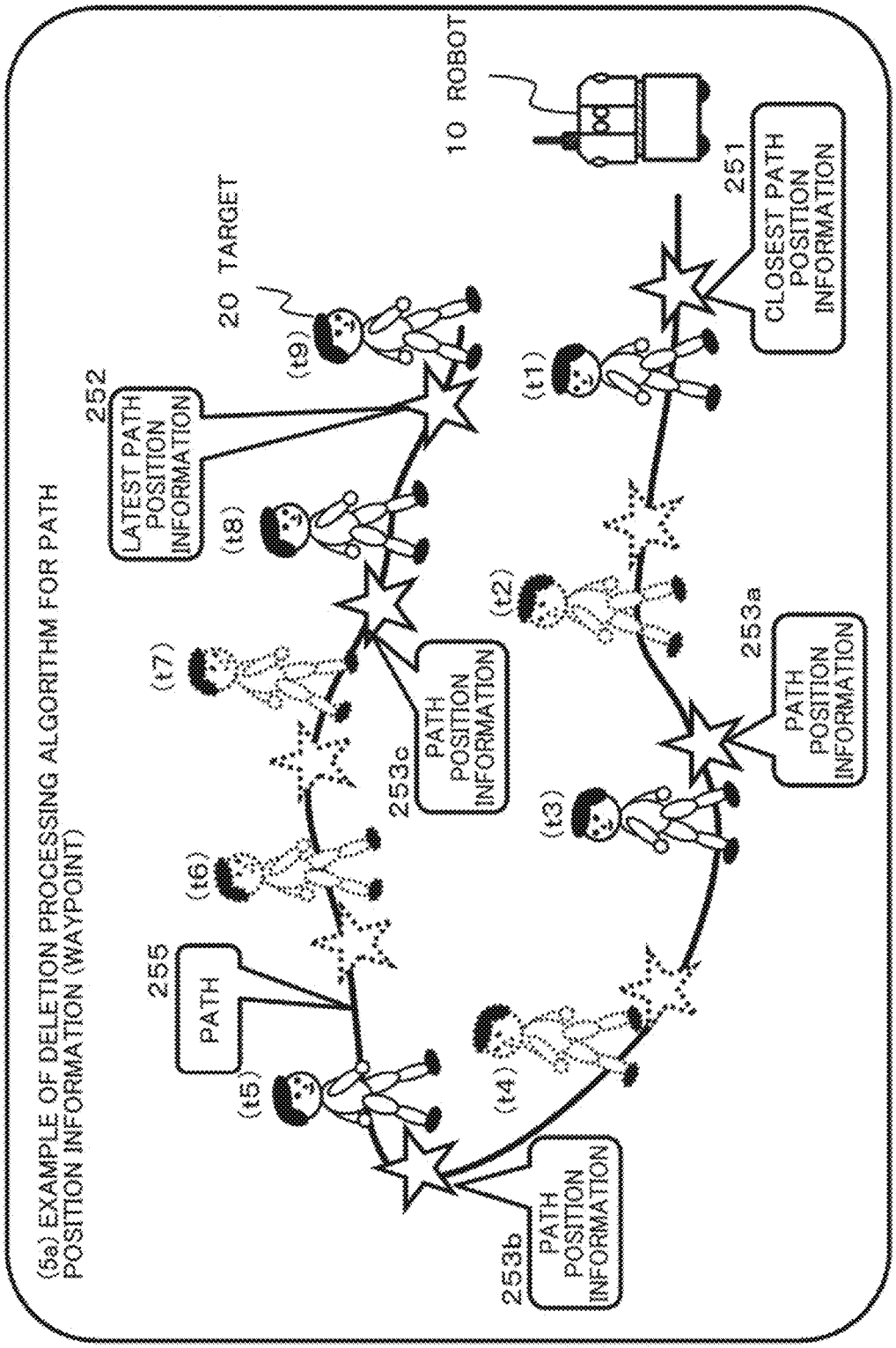
FIG. 18 is a diagram for explaining an example of a deletion processing algorithm for path position information (waypoint).

FIG. 18 is a diagram for explaining "(5a) an example of deletion processing algorithm for path position information (waypoint)".

Specifically, it is a diagram for explaining an example of processing of deleting a piece of path position information (waypoint) created by the robot 10.

The robot 10 illustrated in FIG. 18 creates a path to follow the target 20.

This processing of creating a path is achieved by the processing described above with reference to FIGS. 1 to 3, that is, the processing of creating a piece of path position information (waypoint) near the target and the processing of connecting the created pieces of path position information (waypoints).

Specifically, the processing is performed in accordance with the following rule for setting path position information (waypoint).

Rule: Set a new piece of path position information (waypoint) on a circle with a radius Ra centered on the target and at an angular position of a specified angle (for example, 150 degrees counterclockwise) with respect to the travel direction of the target to be followed.

Note that various settings are possible for the angle for a piece of path position. information (waypoint) to be set.

A new piece of path position information is set in accordance with the above-mentioned Rule, and a path is created by the processing of connecting the new piece of path position information and the previously created piece of path position information.

These pieces of information are recorded, for example, in a map stored in the storage unit inside the robot 10.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

However, when the target 20 to be followed changes its travel direction by 180 degrees as illustrated in FIG. 18 to turn and move so that the latest position of the target 20 approaches the current position of the robot 10, the processing of deleting a created piece of path position information (waypoint) is performed.

FIG. 18 illustrates a movement path of the target 20 to be followed by the robot 10 over time (t1 to t9).

The target 20 moves away from the robot 10 from the times t1 to t4, then changes direction and moves closer to the robot 10 from t5 to t9.

A "piece of closest path position information 251" illustrated in FIG. 18 is a piece of path position information (waypoint) at the position closest to the robot 10. A "piece of latest path position information 252" is the latest piece of path position information (waypoint) created based on the target position at a time 49).

The pieces of path position information (waypoint) created based on the target positions at the times (t2) to (t8) indicate the result of the deletion processing performed according to "Example 1 of deletion algorithm for path position information (waypoint)" described above with reference to FIGS. 15 to 17. Only "pieces of valid path position information 253a to 253c" remain, and other pieces of path position information indicated by dotted lines have been deleted.

Even when the deletion processing performed according to "Example 1 of deletion algorithm for path position information (waypoint)" described above with reference, to FIGS. 15 to 17 is performed, a path 255 on which the target 20 is to be followed becomes a path along the movement path of the target 20.

However, the position of the robot 10 and the position of the target 20 at the current time (t9) are very close to each other, and it would be a waste of time and effort for the robot 10 to perform the processing for following the target 20 along the movement trajectory of the target 20 along the path 255.

"(5) Example 2 of deletion algorithm for path position information (waypoint)" is an algorithm valid for such a case.

This algorithm will be described with reference to FIG. 19.

Figure 19:
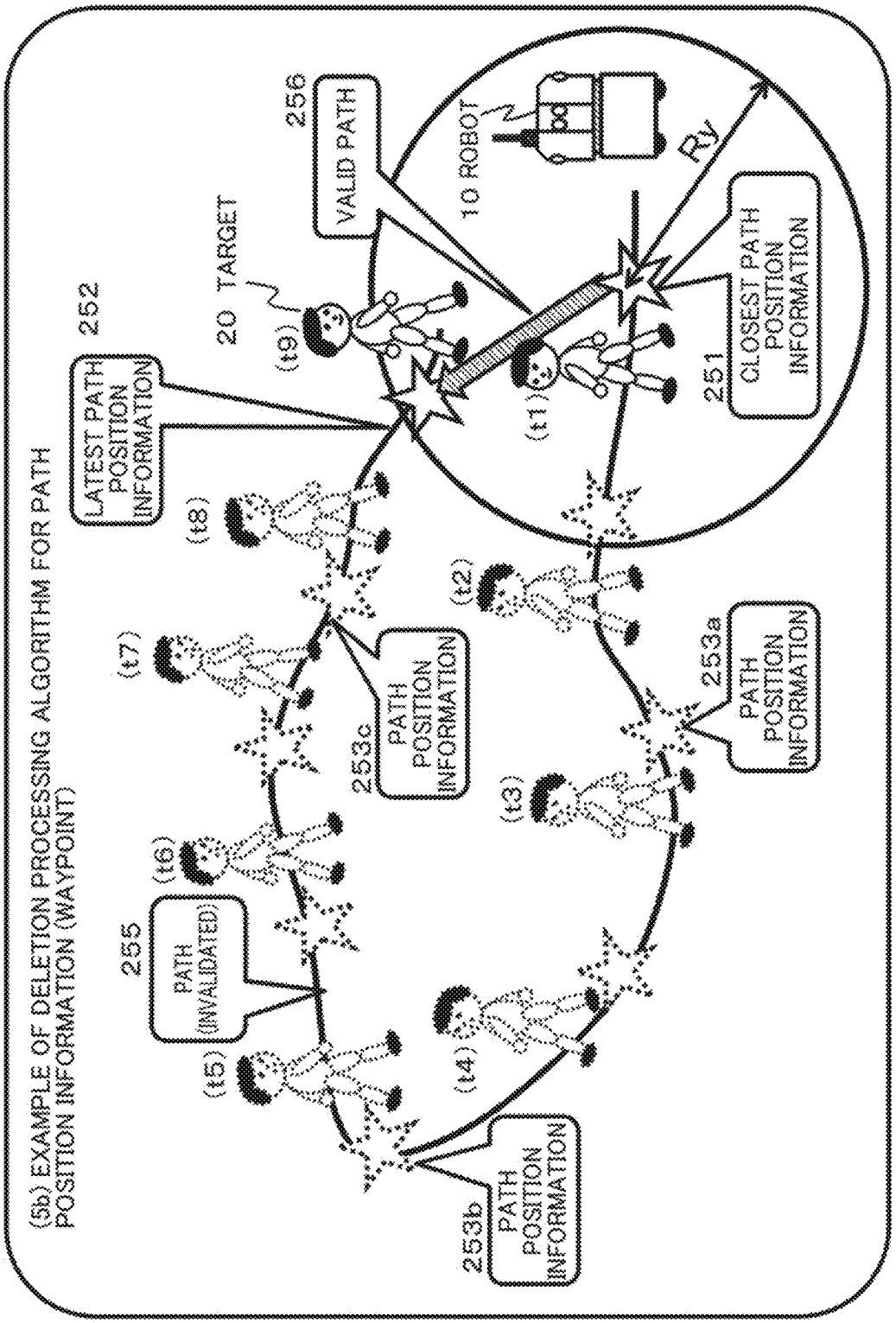
FIG. 19 is a diagram for explaining an example of a deletion processing algorithm for path position information (waypoint).

In the case where the "piece of latest path position information 252" is set within a predetermined distance (Ry) from the "piece of closest path position information 251", which is a piece of path position information (waypoint) closest to the robot 10, as illustrated in FIG. 19, the "pieces of in-between path position information 253a to 253c" between the "piece of closest path position information 251" and the "piece of latest path position information 252" are deleted.

This processing of deleting the "pieces of in-between path position information 253a to 253c" invalidates the path 255 passing through the "pieces of in-between path position information 253a to 253c", and then a new path that directly connects the "piece of closest path position information 251" and the "piece of latest path position information 252" which is within the specified distance (Ry) is set as a valid path 256.

The robot 10 follows the target 20 along this valid bus 256.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

The processing of deleting a piece(s) of path position information (waypoints) and setting a new path are performed in this way, and further following the target along the newly set path is performed, so that it is possible to achieve highly efficient target following processing.

Figure 20:
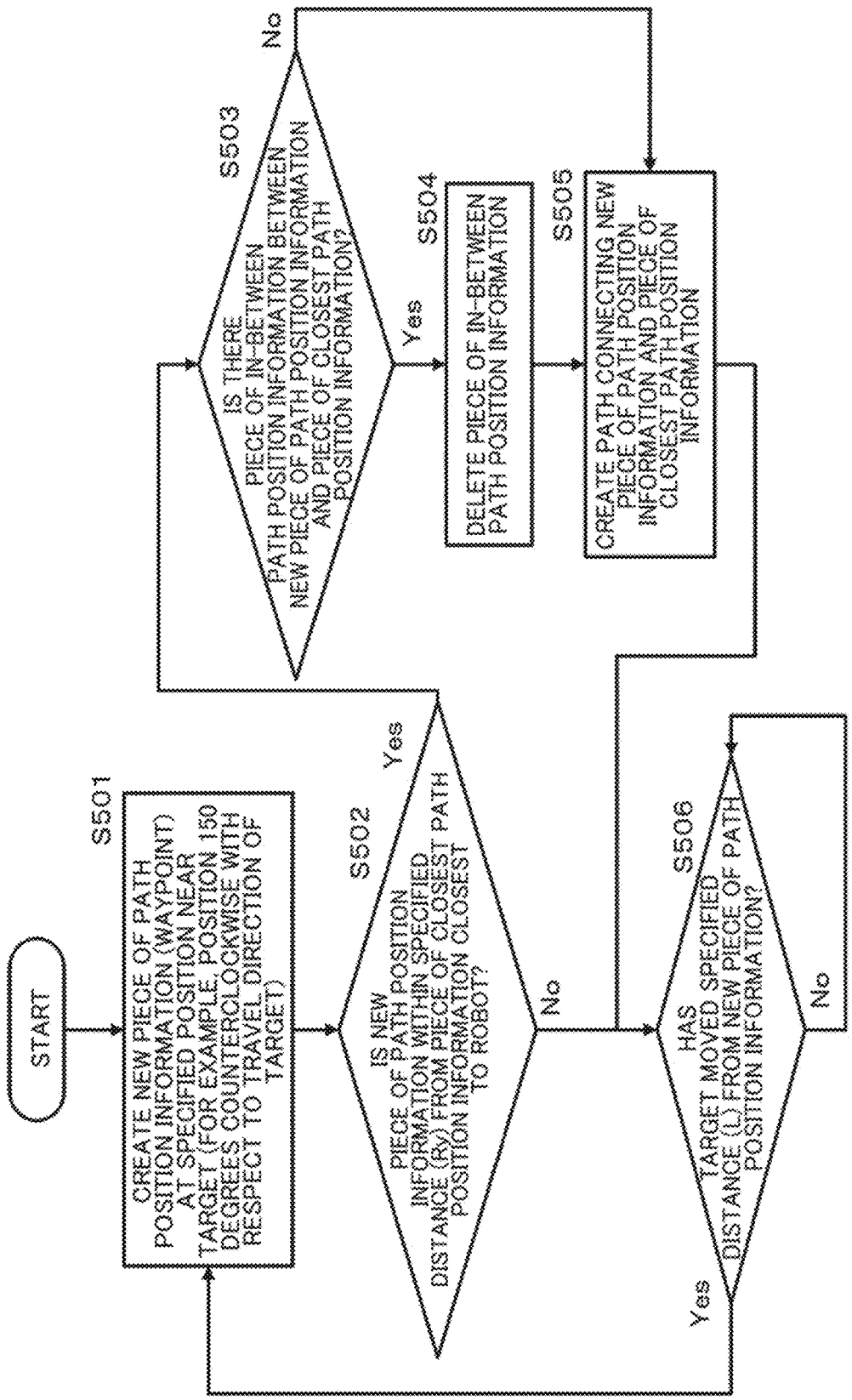
FIG. 20 illustrates a flowchart for explaining the processing sequence of a deletion processing algorithm for path position information (waypoint).

This processing algorithm, that is, the sequence of processing of "(5) Example 2 of deletion algorithm for path position information (waypoint)" will be described with reference to the flowchart illustrated in FIG. 20.

Processing of each step in the flow illustrated in FIG. 20 will be sequentially described below.

(Step S501)

First, in step S501, the data processing unit of the robot 10 creates in accordance with the predetermined Rule a "new piece of path position information (waypoint)" at a specified position near the target to be followed, for example, a position 150 degrees counterclockwise with respect to the travel direction of the target).

Note that various settings are possible for the angle for a piece of path position information (waypoint) to be set.

(Step S502)

Next, in step S502, the data processing unit of the robot 10 determines whether or not the "new piece of path position information (waypoint)" created in step S501 is at a position within a predetermined distance (Ry) from a "piece of closest path position information (waypoint)" closest to the current position of the robot 10.

A map in which pieces of path position information (waypoints) are recorded is recorded in the storage unit of the robot 10.

The data processing unit of the robot 10 refers to the map stored in the storage unit and determines whether or not a distance between the "new piece of path position information (waypoint)" and the "piece of closest path position information (waypoint)" is within the predetermined distance (Ry).

When the distance between the "new piece of path position information (waypoint)" and the "piece of closest path position information (waypoint)" is within the predetermined distance (Ry), the processing proceeds to step S503. On the other hand, when the distance between the "new piece of path position information (waypoint)" and the "piece of closest path position information (waypoint)" is not within the predetermined distance (Ry), the processing proceeds to step S506.

(Step S503)

When it is determined in step S502 that the distance between the "new piece of path position information (waypoint)" created in step S501 and the "piece of closest path position information (waypoint)" is within the predetermined distance (Ry), the processing of step S503 is performed.

In this case, in step S503, the data processing unit of the robot 10 determines whether or not there is a created piece of path position information between "the new piece of path position information (waypoint)" created in step S501 and the "piece of closest distance path position information (waypoint)", that is, a "piece of in-between path position information".

When there is a "piece of in-between path position information", the processing proceeds to step S504.

Otherwise, the processing proceeds to step S505.

(Step S504)

Next, when it is determined in step S503 that there is a created piece of path position information between "the new piece of path position information (waypoint)" created in step S501 and the "piece of closest path position information (waypoint)", that is, a "piece of in-between path position information", the data processing unit of the robot 10 performs processing of deleting the "piece of in-between path position information" in step S504.

(Step S505)

The processing of step S505 is performed when the processing of deleting the "piece of in-between path position information" has been performed in step S504 or when a "piece of in-between path position information" is not detected in step S503.

In these cases, the data processing unit of the robot 10 creates a path connecting the "new piece of path position information (waypoint)" and the "piece of closest path position information (waypoint)" in step S505.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

(Step S506)

The processing of step S506 is performed when the path creation has been performed in step S505 or when it is determined in step S502 that the distance between the "new piece of path position information (waypoint)" and the "piece of closest path position information (waypoint)" is not within the predetermined distance (Ry).

In step S506, the data processing unit of the robot 10 determines whether or not the target to be followed has moved a predetermined distance (L) from the position at which the new piece of path position information was created.

When the target has not moved, the path is not updated.

When it is determined that the target has moved the predetermined distance (L), the processing returns to step S501 to further perform the processing of creating a new piece of path position information (waypoint) at that movement position, and then the processing of steps S501 to S506 is performed repeatedly.

By the processing performed in this way, for a case where the target 20 moves closer to the robot 10, it is possible to create a path to approach the target 20 more efficiently.

The robot 10 can reliably and efficiently follow the target to be followed by moving along this new path.

(6) Position Correction Algorithm for Path Position Information (Waypoint)

Next, "(6) Position correction algorithm for path position information (waypoint)" will be described.

"(6) Position correction algorithm for path position information (waypoint)" will be described with reference to FIGS. 21 and 22.

In "(1) Basic algorithm of target following processing" described above with reference to FIGS. 1 to 3, the processing in accordance with the following setting rule for path position information (waypoint) is performed.

Rule: Set a new piece of path position information (waypoint) on a circle with a radius Ra centered on the target and at an angular position of a specified angle (for example, 150 degrees counterclockwise) with respect to the travel direction of the target to be followed.

Note that various settings are possible for the angle for a piece of path position information (waypoint) to be set.

A new piece of path position information is set in accordance with the above-mentioned Rule, and a path is created by the processing of connecting the new piece of path position information and the previously created piece of path position information.

However, if a piece of path position information (waypoint) based on the position of the target to be followed is set in accordance with this Rule, a piece of path position information (waypoint) may be set, for example, at a position very close to an obstacle such as a wall or within an obstacle due to a recognition error. When the robot 10 travels along a path passing though such a piece of path position information, the robot 10 may contact or collide with the obstacle such as a wall.

A specific example will be described with reference to FIG. 21.

Figure 21:
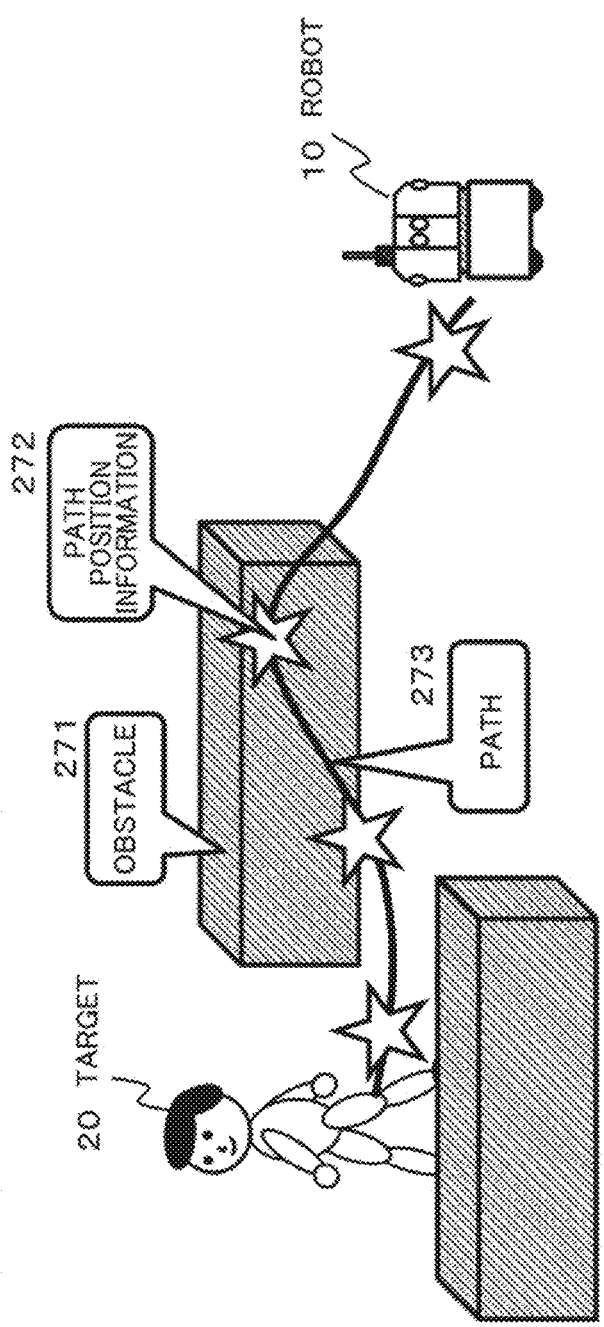
FIG. 21 is a diagram for explaining a position correction algorithm for path position information (waypoint).

The robot 10 illustrated in FIG. 21 follows the target 20. The data processing unit of the robot 10 uses "(1) Basic algorithm of target following processing" described above with reference to FIGS. 1 to 3 to set the above-mentioned Rule, that is, Rule: Set a new piece of path position information (waypoint) on a circle with a radius Ra centered on the target and at an angular position of 150 degrees counterclockwise with respect, to the travel direction of the target to be followed.

Note that various settings are possible for the angle for a piece of path position information (waypoint) to be set.

A piece of path position information (waypoint) is set in accordance with that Rule, and a path is created by the processing of connecting the set pieces of path position information.

If such processing is performed, for example, a piece of path position information (waypoint) 272 may be set at a position extremely close to an obstacle 271 such as a wall as illustrated in FIG. 21.

When the robot 10 travels along a resulting path 273, the robot 10 may contact or collide with the obstacle 271 such as a wall.

Processing performed by the data processing unit of the robot 10 to prevent such a problem will be described with reference to FIG. 22.

When the piece of path position information (waypoint) and the path, which have been created according to "(1) Basic algorithm of target following processing" described with reference to FIGS. 1 to 3, is set at a position where the robot 10 may contact an obstacle, the data processing unit of the robot 10 corrects the position of the piece of path position information (waypoint) and the position of the path.

First, the data processing unit of the robot 10 draws on an occupancy grid map the piece of path position information (waypoint) and the path, which have been created according to "(1) Basic algorithm of target following processing" described with reference to FIGS. 1 to 3.

The occupancy grid map is a map indicating a robot movement plane, and is a map composed of a large number of rectangular cells partitioned into a grid. It is a map that enables identification of the presence or absence of an obstacle in each rectangular cell.

Figure 22:
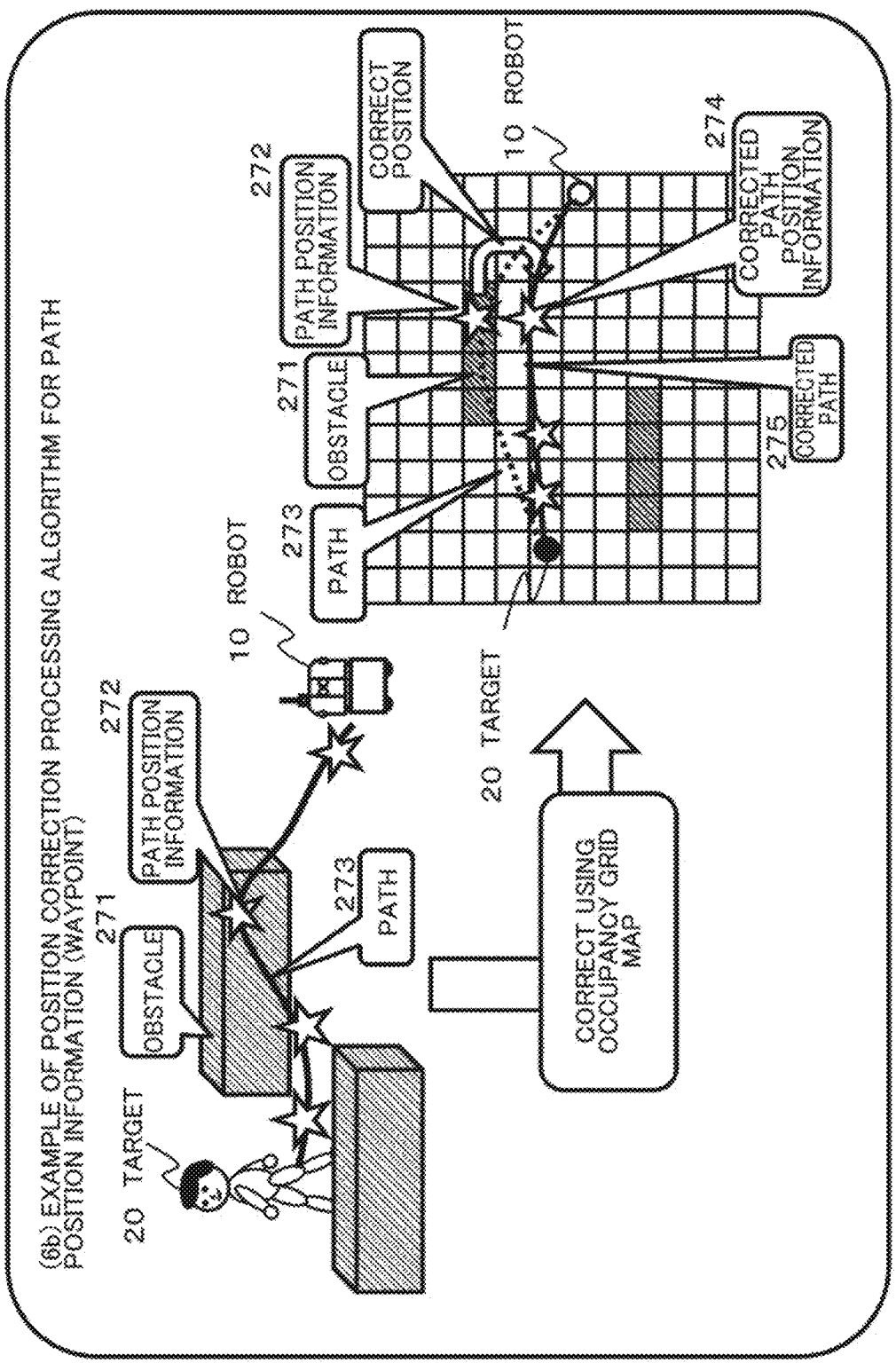
FIG. 22 is a diagram for explaining a position correction algorithm for path position information (waypoint).

As illustrated in FIG. 22, the occupancy grid map has obstacle areas which are shaded, and is made up as a map such that the obstacle areas and robot passable areas other than the obstacle areas can be clearly distinguished.

The data processing unit of the robot 10 refers to this occupancy grid map and corrects the piece of path position information (waypoint) and the path.

As illustrated in FIG. 22, the piece of path position information (waypoint) 272 and the path 273 which are represented on the occupancy grid map are set within the area of the obstacle 271 or at a position very close, to the obstacle 271.

In such a case, the data processing unit of the robot 10 corrects the piece of path position information (waypoint) 272 and the path 273 to positions away from the obstacle 271.

As illustrated, a new piece of corrected path position information (waypoint) 274 is set at a position away from the obstacle 271, and a new corrected path 275 passing through the set piece of corrected path position information (waypoint) 274 is set.

The data processing unit of the robot 10 causes the robot 10 to travel along this corrected path 275. This processing enables the robot 10 to travel without contacting or colliding with the obstacle 271 such as a wall.

4. Processing of Controlling Movement Speed of Mobile Device (Robot)

Next, processing of controlling the movement speed of a mobile device (robot) will be described.

The movement speed planning unit 109 of the path planning unit 105 of the mobile device (robot) 100 illustrated in FIG. 4 determines a movement speed for the moving device (robot) traveling along the movement path (path) created by the movement path creation unit 108 of the path planning unit 105 of the mobile device (robot) 100.

The movement path and movement speed information determined by the path planning unit 105 are output to the robot control information creation unit 106, and the robot control information creation unit 106 creates robot control information for moving the mobile device (robot) 100 along the movement path and with the movement speed, which are from the path planning unit 105, and outputs the robot control information to the robot drive unit 107.

The robot drive unit 107 drives the mobile device (robot) 100 according to the robot control information received from the robot control information creation unit 106.

In other words, drive processing of moving the mobile device (robot) 100 to follow the target to be followed is performed.

A specific example of processing of determining a movement speed for a mobile device (robot), performed by the movement speed planning unit 109 of the path planning unit 105 will be described.

Figure 23:
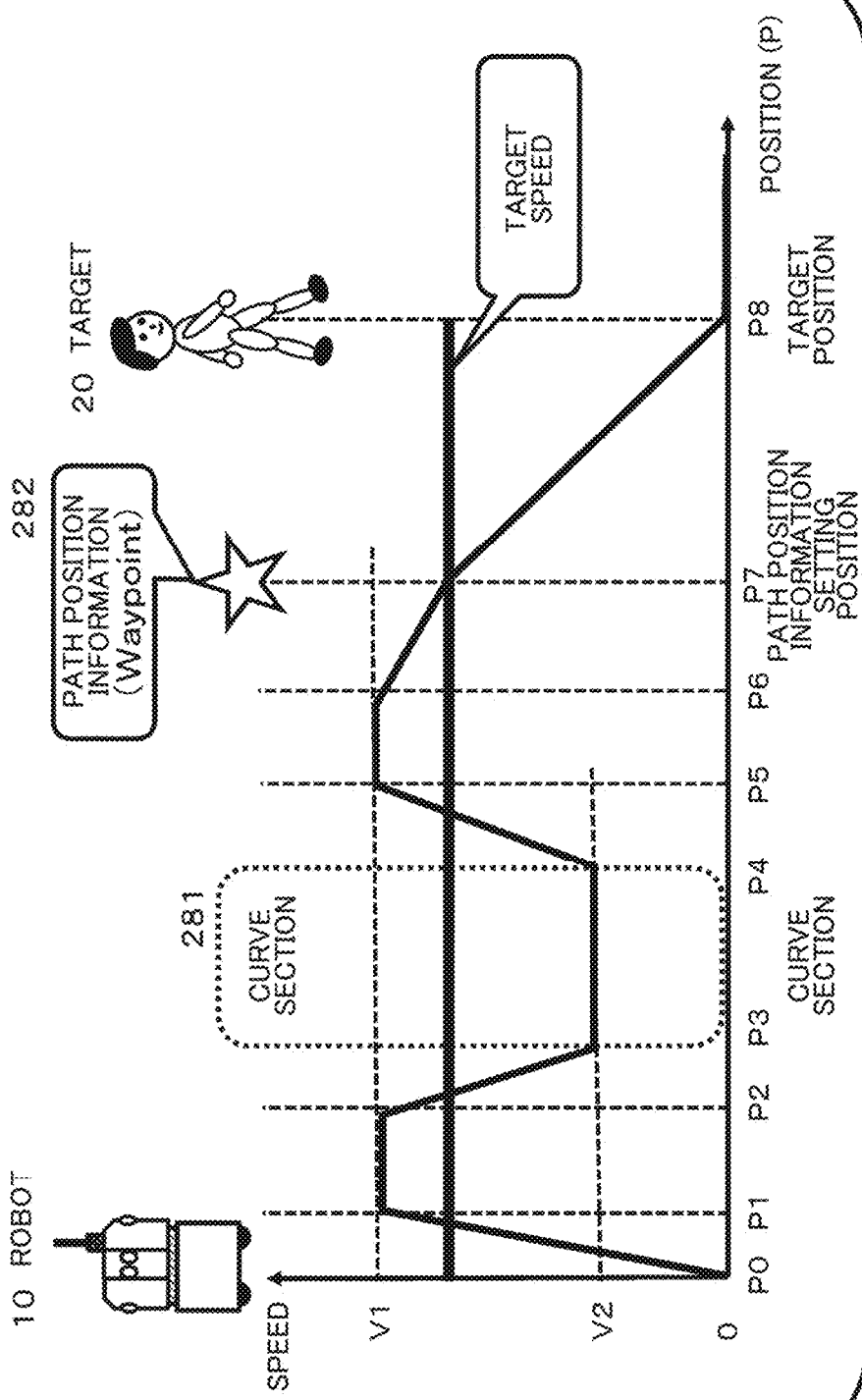
FIG. 23 is a diagram for explaining a specific example of processing of determining a movement speed for a mobile device (robot), performed by a movement speed planning unit.

FIG. 23 is a diagram for explaining a specific example of processing of determining a movement speed for a mobile device (robot), performed by the movement speed planning unit 109.

A graph illustrated in FIG. 23 is a graph with the position (P) on the horizontal axis and the speed of the robot 10 on the vertical axis.

The current position of the robot 10 is the position P=P0.

The target 20 to be followed is at the position P=P8.

A piece of path position information (waypoint) set by the movement path creation unit 108 is set at the position=P7.

In this example, a path (movement path) from the current position (P0) of the robot 10 to the position (P7) of the piece of path position information (waypoint) has been created by the path creation processing by the movement path creation unit 108 of the path planning unit 105.

At this time, the movement speed planning unit 109 of the path planning unit 105 performs processing of determining a movement speed for the mobile device (robot) as illustrated in FIG. 23.

First, the robot is set to move from the stop position (P0) to the position (P1) while speeding up.

The robot is set to move from the position (P1) to the position (P2) with the maximum speed (V1) after reaching an allowable maximum speed (V1) at the position (P1).

In addition, the data processing unit (movement speed planning unit 109) of the robot 10 recognizes from the map stored in the storage unit inside the robot that there is a curve section 281 on the path between the position (P3) and the position (P4), and the robot is set to start to slow down at the position (P2) before entering the curve section 281.

The robot is set to slow down from the position (P2) to the position (P3), set the speed to a low speed (V2) at the entry position (P3) of the curve section 281, and travel at that low speed to the curve section end position (P4).

The speed (V2) is set according to the curvature of the path. For example, for the case where the path has a constant curvature, the speed is set to be constant. For the case where the path is created using Bezier curves, the speed is set to vary continuously.

When the curve section 281 ends, speed-up starts again. The robot is set to speed up from the curve section end position (P4) to the position (P5), and move at the maximum speed (V1) from the position (P5) to the position (P6) after reaching the allowable maximum speed (V1) at the position (P5), After that, the data processing unit (movement speed planning unit 109) of the robot 10 recognizes from the map stored in the storage unit inside the robot that a piece of path position information (waypoint) 282 is set at the position (P7), and set a section from the position (P6) to the position (P7) of the piece of path position information (waypoint) 282 as a slow-down section.

Since the position (P7) is the goal for the follow-up, the robot is set to have the same speed as the speed of the target at that position.

In addition, the robot is set to further slow down from the position (P7) of the piece of path position information (waypoint) 282 to the position (P8) of the target 20, and have a speed of 0 when reaching the position (P8) of the target 20.

The position (P8) is set to a position behind the target to avoid collision with the target, and accordingly, the robot is set to slow down to stop at that position.

Note that the graph illustrated in FIG. 23 is merely a specific example of processing of determining a movement speed for a mobile device (robot), performed by the movement speed planning unit 109.

When the target 20 continues to move, the movement path creation unit 108 of the path planning unit 105 sets a new piece of path position information (waypoint) as the target moves, and creates a new path.

The movement speed planning unit 109 of the path planning unit 105 sequentially performs the processing of determining a movement speed according to the new piece of path position information (waypoint) and the new path which have been created by the movement path creation unit 108.

5. Example of Target Following Processing by Flying Mobile Device

Next, an example of target following processing by a flying mobile device will be described.

In the above-described embodiment, an example of following processing using a robot that, moves on a plane where the target to be followed moves has been described. However, the mobile device that follows the target may be a flying mobile device such as a drone.

Figure 24:
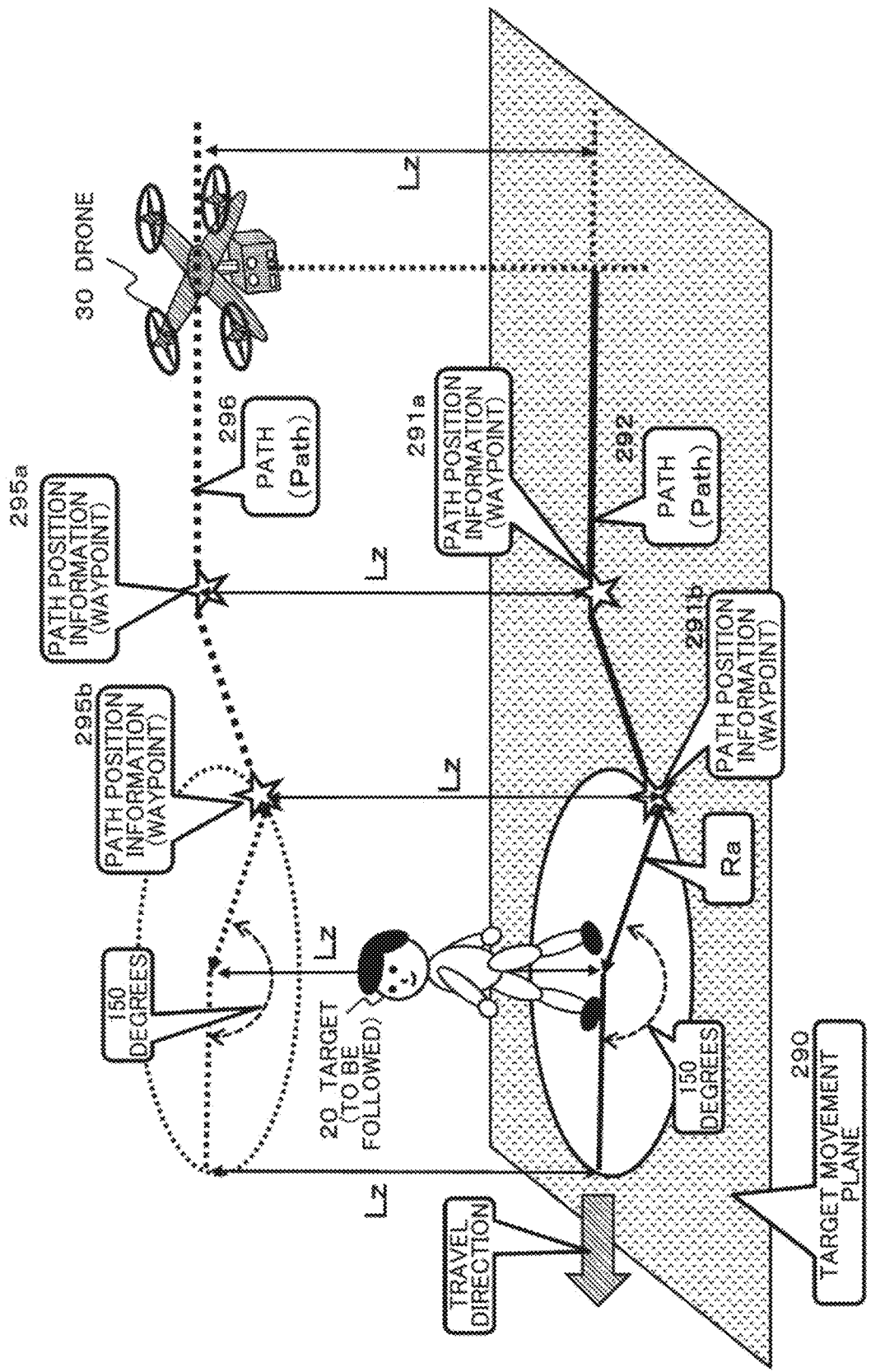
FIG. 24 is a diagram illustrating an example of target following processing performed by a drone.

FIG. 24 is a diagram illustrating an example of processing of following the target 20, performed by a drone 30.

The drone 30 illustrated in FIG. 24 flies above a movement plane 290 of the target 20 to be followed by a height (Lz) to follow the target 20.

The drone 30 also includes a data processing unit similar to that of the mobile device (robot) 100 described above with reference to FIG. 4.

In such a setup, the data processing unit of the drone 30 first creates pieces of path position information (waypoint) 291 on the movement plane 290 of the target 20 to be followed and a path 292 connecting the pieces of path position information.

The processing of creating the pieces of path position information and the path is the same as the processing described above with reference to FIGS. 1 to 3 and 5 to 22.

For the processing of connecting the pieces of path position information (waypoints), for example, a predetermined curvature limit and a continuous curvature change (Bezier curve) are used. Therefore, it is possible to plan paths and speed in consideration of lateral acceleration and lateral jerk.

After that, the data processing unit of the drone 30 deploys the pieces of path position information (waypoints) and the path, which have been created on the movement plane 290 of the target 20, on the flight plane of the drone 30, that is, a flight plane at the height Lz.

The drone 30 flies along pieces of path position information (waypoints) 295 and a path 296, which are deployed on the flight plane of height Lz.

Note that the height is not limited to a fixed value, and can be set to various heights with respect to the position of the target. In this case, the path to be created is three-dimensional.

Through such processing, the drone 30 follows the target 20 to be followed in the sky.

6. Configuration Example of Mobile Device and Information Processing Device According to Present Disclosure Next, a configuration example of a mobile device and an information processing device, according to the present disclosure will be described.

The mobile device according to the present disclosure is the robot 10 or the drone 30 described in the above embodiments. As described above, examples of the mobile device according to the present disclosure include not only such an autonomous mobile robot but also various mobile devices such as a self-driving vehicle and a drone.

A movement path may be set or controlled for a mobile device, such as path creation processing, by a data processing unit of an information processing device provided inside the mobile device such as the robot 10 or by an external information processing device that can communicate with the robot.

Figure 25:
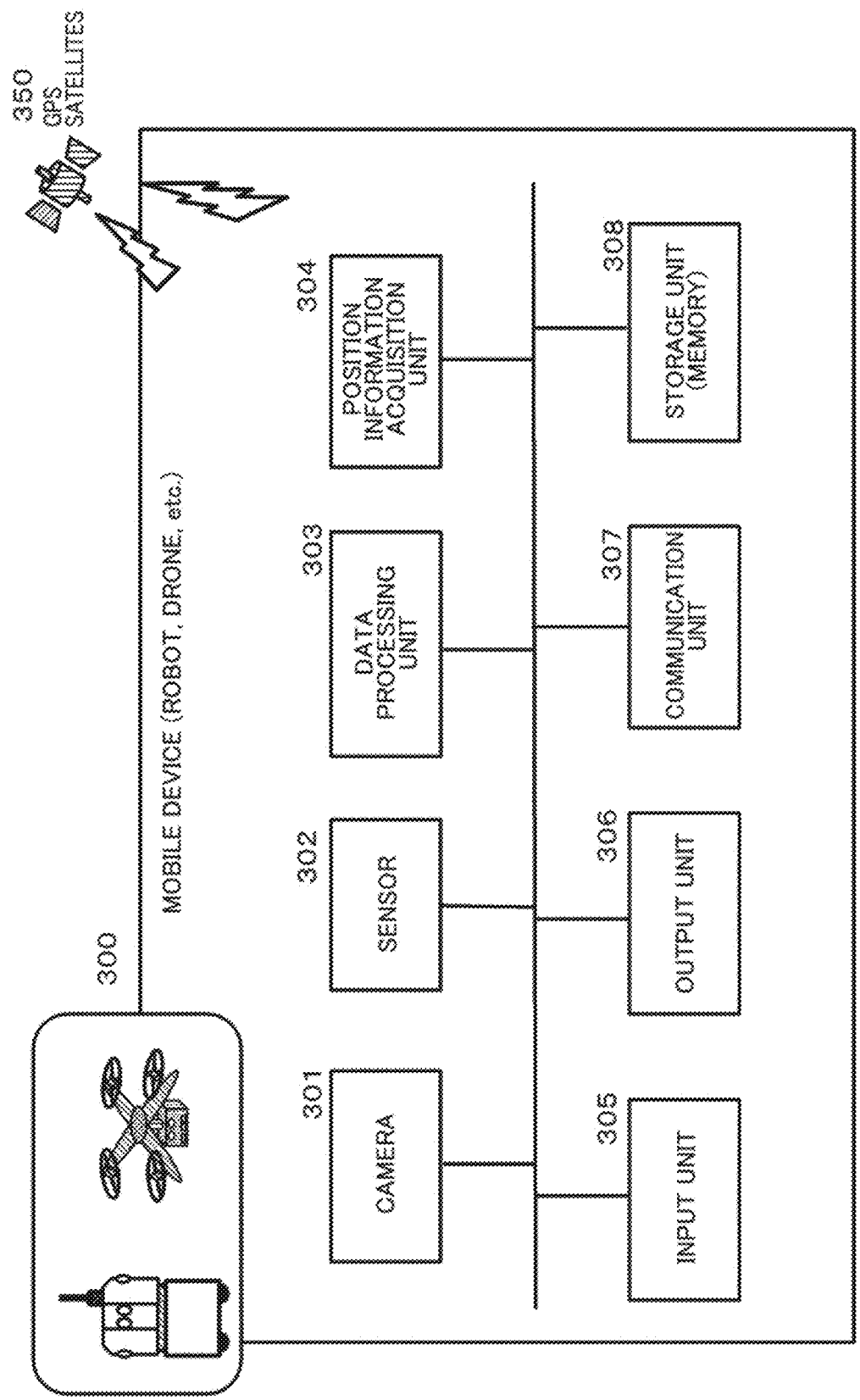
FIG. 25 is a diagram for explaining a configuration example of a mobile device for the case where a movement path is set and controlled for the mobile device, such as path creation processing, by the mobile device alone.

FIG. 25 is a diagram illustrating a configuration example of a mobile device 300 for the case where a movement path is set and controlled for the mobile device, such as path creation processing, by the mobile device alone. Specifically, it is a diagram illustrating a configuration example of the mobile device 300 for the case where a movement path is set and controlled for the mobile device, such as path creation processing, by an information processing device provided inside the mobile device.

Figure 26:
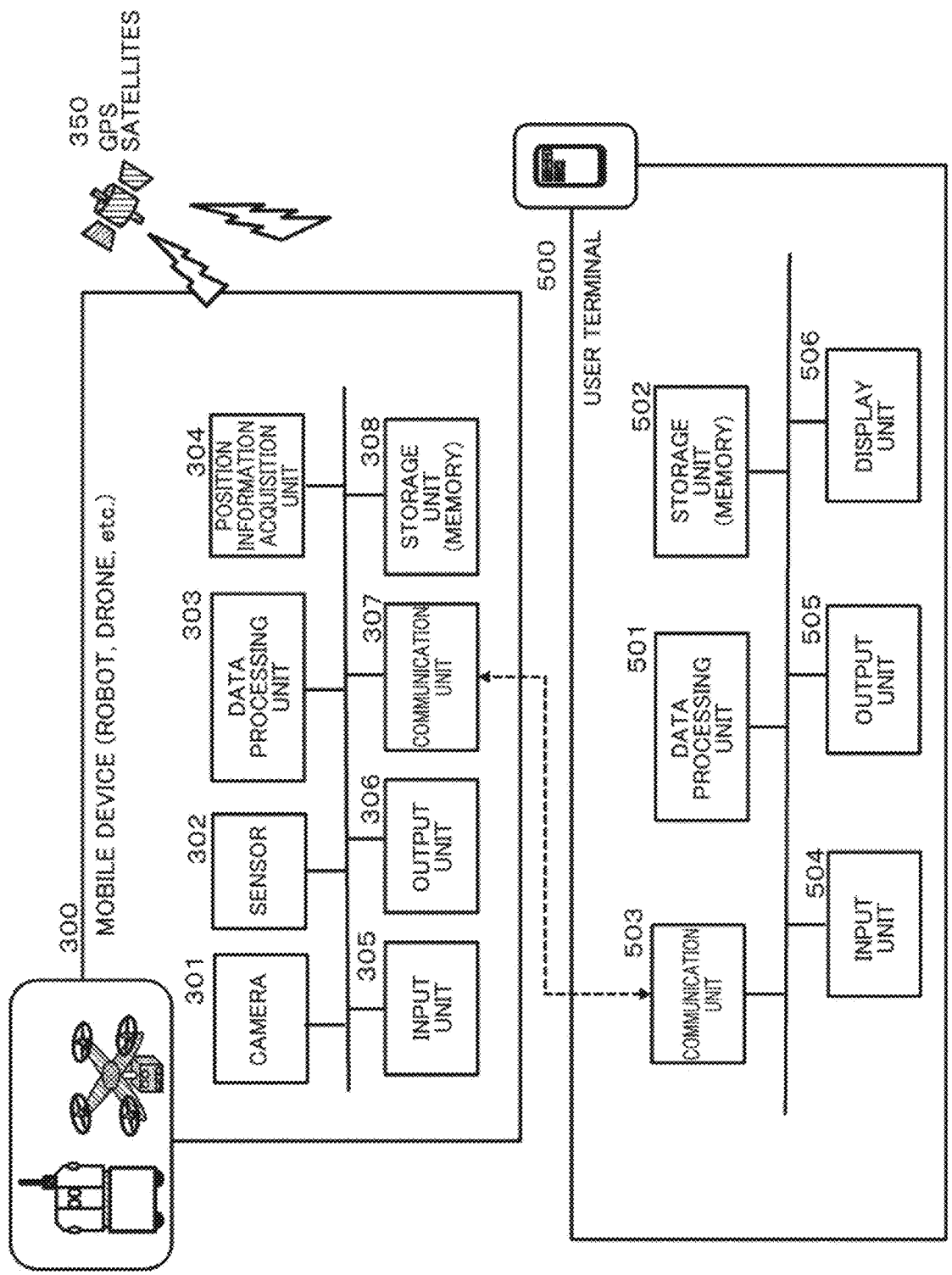
FIG. 26 is a diagram for explaining a configuration example of a mobile device and a user terminal that can communicate with the mobile device for the case where a movement path is set and controlled for the mobile device, such as path creation processing, by the user terminal.

FIG. 26 is a diagram illustrating a configuration example of the mobile device 300 and a user terminal 500 that can communicate with the mobile device for the case where a movement path is set and controlled for the mobile device, such as path creation processing, by the user terminal such as a controller, a PC, or a smartphone.

First, with reference to FIG. 25, a configuration example of the mobile device 300 for the case where a movement path is set and controlled for the mobile device, such as path creation processing, by the mobile device alone will be described, As illustrated in FIG. 25, the mobile device 300 includes a camera 301, a sensor 302, a data processing unit 303, a position information acquisition unit 304, an input unit 305, an output unit 306, a communication unit 307, and a storage unit (memory) 308.

The camera 301 captures an image in the travel direction of the mobile device 300 and an image of a target to be followed.

The sensor 302 is an object detection sensor using LiDAR (Light Detection and Ranging, Laser Imaging Detection and Ranging), for example. It measures the distance to an obstacle, for example. Note that the sensor 302 is not limited to LiDAR, and may be, for example, a stereo camera, a ToF sensor, an ultrasonic sensor, a radar, a sonar, or the like.

For a drone, the target may hold a terminal, and position information acquired using the UPS of the terminal of the target may be used.

The data processing unit 303 performs processing according to the above-described embodiments, that is, the processing of creating a piece of path position information (waypoint), the processing of creating a path connecting the pieces of path position information (waypoints), and even the processing of determining a movement speed, the processing of controlling the drive of the mobile device, and so on.

The target recognition unit 102, the obstacle map creation unit 104, the path planning unit 105, the robot control information creation unit 106, and so on, which are the main components of the mobile device (robot) 100 described above with reference to FIG. 4, are included in the data processing unit 303.

The data processing unit 303 includes a processor such as a CPU having a function of executing a program, and performs the processing according to the flowcharts described in the above embodiments.

The program is stored in the storage unit 308.

The position information acquisition unit 304 performs communication with, for example, GPS satellites 350, analyzes the current position (latitude, longitude, height) of the mobile device 300 based on communication information with the GPS satellites 350, and outputs the resulting analysis information to the data processing unit 303.

The input unit 305 is, for example, an operation unit to be operated by a user, and is used for various processing such as processing of receiving user requests, for example, start and stop of traveling.

The output unit 306 includes a sound output unit, an image output unit, and the like.

The communication unit 807 performs communication with a user terminal or an external server.

The storage unit (memory) 308 is used as a storage area and a work area for the program to be executed by the data processing unit 303. It is also used as a storage area for various parameters applied to the processing. The storage unit (memory) 106 is configured of a RAM, a ROM, and the like.

Next, with reference to FIG. 26, a configuration of the mobile device 300 and the user terminal 500 that can communicate with the mobile device for the case where a movement path is set and controlled for the mobile device, such as path creation processing, by the user terminal such as a controller, a PC, or a smartphone, will be described.

The mobile device 300 has a configuration similar to that described with reference to FIG. 25.

It communicates with the user terminal 500 via the communication unit 307.

Next, a configuration of the user terminal 500 will be described. As illustrated, the user terminal 500 includes a data processing unit 501, a storage unit (memory) 502, a communication unit 503, an input unit 504, an output unit 505, and a display unit 506.

The data processing 501 performs the processing of creating a piece of path position information (waypoint) for the mobile device 300, the processing of creating a path connecting the pieces of path position information (waypoints), and even the processing of determining a movement speed, the processing of creating drive control information for the mobile device, and so on.

The processing performed by the target recognition unit 102, the obstacle map creation unit 104, the path planning unit 105, the robot control information creation unit 106, and so on, which are the main components of the mobile device (robot) 100 described above with reference to FIG. 4, is performed by the data processing unit 501.

The data processing unit 501 of the user terminal 500 creates a piece of path position information (waypoint) and a connection path, further creates drive control information for driving the mobile device 300 along the created pieces of path position information (waypoints) and connection path, and transmits the drive control information to the mobile device 300 via the communication unit 503.

The mobile device 300 moves according to the drive control information received from the user terminal 500.

The data processing unit 501 includes a processor such as a CPU having a function of executing a program, and performs the processing according to the flowcharts described in the above embodiments.

The program is stored in the storage unit 502.

The storage unit (memory) 502 is used as a storage area and a work area for the program to be executed by the data processing unit 501. It is also used as a storage area for various parameters applied to the processing. The storage unit (memory) 204 is configured of a RAM, a ROM, and the like.

The communication unit 503 performs communication with the mobile device 300 or an external server.

The input unit 504 is, for example, an operation unit to be operated by a user, and is used for various processing such as processing of receiving user requests, for example, starting and ending the control of the mobile device 300.

The output unit 505 includes a sound output unit, an image output unit, and the like.

The display unit 506 is used to display an image captured by the camera of the mobile device 300, a map stored in the storage unit 502, path information created by the data processing unit 501, and the like.

7. Summary of Configuration of Present Disclosure

Embodiments of the present disclosure have been described above in detail with reference to specific embodiments. However, it will be apparent to those skilled in the art that modifications and substations of the embodiments can be made without departing from the scope and spirit of the technology disclosed in the present disclosure. That is, the present invention has been disclosed according to an illustrative form, but the present disclosure should not be restrictively construed. The spirit of the present disclosure should be determined in consideration of the claims.

The technology disclosed herein can be configured as follows:

(1) An information processing device, including:

a movement path creation unit that creates a path which is a following path on which a target is to be followed by a mobile device, wherein the movement path creation unit sequentially sets a piece of path position information (waypoint) near the target, and sequentially connects set pieces of path position information to create the path.

(2) The information processing device according to (1), wherein the movement path creation unit sets the piece of path position information at a position determined in accordance with a predetermined rule based on a position and a travel direction of the target.

(3) The information processing device according to (1) or (2), wherein the movement path creation unit sets the piece of path position information on a circle centered on the position of the target and at a position of a predetermined angle with respect to the travel direction of the target.

(4) The information processing device according to any one of (1) to (3), wherein the movement path creation unit sets a new piece of path position information when the target has moved a predetermined distance.

(5) The information processing device according to any one of (1) to (4), wherein the movement path creation unit sets the piece of path position information on a direction vector connecting a past position and a current position of the target.

(6) The information processing device according to any one of (5), wherein the movement path creation unit sets the piece of path position information on the direction vector connecting the past position and the current position of the target when the target changes direction.

(7) The information processing device according to any one of (1) to (6), wherein as the target moves, the movement path creation unit performs processing of deleting a piece of in-between path position information between two pieces of path position information which are at a predetermined distance from each other among a plurality of set pieces of path position information.

(8) The information processing device according to (7), wherein the movement path creation unit creates a path connecting two remaining pieces of path position information after the processing of deleting the piece of in-between path position information.

(9) The information processing device according to any one of (1) to (8), wherein when a piece of closest path position information which is a piece of path position information closest to a current position of the mobile device and a piece of latest path position information which is the latest piece of path position information are within a predetermined distance, the movement path creation unit performs processing of deleting a piece of in-between path position information between the piece of closest path position information and the piece of latest path position information.

(10) The information processing device according to (9), wherein the movement path creation unit creates a path connecting the piece of closest path position information and the piece of latest path position information after the processing of deleting the piece of in-between path position information.

(11) The information processing device according to any one of (1) to (10), wherein when a piece of path position information is set within or near an obstacle, the movement path creation unit performs path position information position correction processing of correcting the piece of path position information to a position away from the obstacle.

(12) The information processing device according to (11), wherein the movement path creation unit refers to an occupancy grid map to perform the path position information position correction processing.

(13) The information processing device according to any one of (1) to (12), wherein the information processing device is provided in the mobile device.

(14) The information processing device according to any one of (1) to (12), wherein the information processing device is capable of communicating with the mobile device.

(15) An information processing system, including: a mobile device; and an information processing device capable of communicating with the mobile device, wherein the information processing device performs:

processing of creating a path on which a target is to be followed by the mobile device, the processing of creating a path including processing of sequentially setting a piece of path position information (waypoint) near the target, and processing of creating a path connecting adjacent pieces of path position information; and further creating mobile device control information for moving the mobile device along the created path and transmitting the mobile device control information to the mobile device, and the mobile device moves according to the mobile device control information received from the information processing device to perform processing of following the target.

(16) An information processing method performed in an information processing device, the information processing device including a movement path creation unit that creates a path which is a following path on which a target is to be followed by a mobile device, the information processing method including, by the movement path creation unit, sequentially setting a piece of path position information (waypoint) near the target; and sequentially connecting set pieces of path position information to create the path.

(17) An information processing method performed in an information processing system including a mobile device and an information processing device capable of communicating with the mobile device, the information processing method including, by the information processing device, processing of creating a path on which a target is to be followed by the mobile device, the processing of creating a path including processing of sequentially setting a piece of path position information (way-point) near the target, and processing of creating a path connecting adjacent pieces of path position information; and further creating mobile device control information for moving the mobile device along the created path and transmitting the mobile device control information to the mobile device, the information processing method including moving the mobile device in accordance with the mobile device control information received from the information processing device to perform processing of following the target.

(18) A program for causing an information processing device to execute information processing, the information processing device including a movement path creation unit that creates a path which is a following path on which a target is to be followed by a mobile device, the program causing the movement path creation unit to execute:

processing of sequentially setting a piece of path position information (waypoint) near the target, and processing of sequentially connecting set pieces of path position information to create the path.

The series of processing described in the specification can be executed by hardware, software, or a composite configuration of both. When the processes are performed by software, a program including the process sequence can be installed in and executed by a memory of a computer assembled into exclusive hardware. Alternatively, the program can he installed in and executed by a general-purpose computer performing various processes. For example, the program can be recorded in advance on a recording medium. The program cannot only be installed in a computer from a recording medium but may be also received through a network such as a LAN (Local Area Network) and the Internet and installed in a recording medium such as a built-in hard disk.

The various processes described in this specification can be performed consecutively in the described order or may be performed in parallel or individually depending on the processing capability of the device performing the processes or as needed. In the present specification, the system is a logical set of configurations of a plurality of devices, and the devices having each configuration are not limited to those in the same housing.

INDUSTRIAL APPLICABILITY

As described above, according to the configuration of one embodiment of the present disclosure, it is possible to realize a device and a method for efficiently creating a following path of a target to be followed by a mobile device to enable reliable follow-up.

Specifically, for example, it includes a movement path creation unit that creates a path which is the following path on which the target is to be followed by the mobile device. The movement path creation unit sequentially sets a piece of path position information (waypoint) near the target, and sequentially connects the set pieces of path position information to create the path. The movement path creation unit sets the piece of path position information at a position determined in accordance with a predetermined rule based on a position and a travel direction of the target. When the target has moved a predetermined distance, a new piece of path position information is set.

With this configuration, it is possible to realize a device and a method for efficiently creating a following path of the target to be followed by the mobile device to enable reliable follow-up.

REFERENCE SIGNS LIST

10 Robot
20 Target (to be followed)
100 Mobile device (robot)
101 Camera
102 Target recognition unit
103 Sensor (LiDAR)
104 Obstacle map creation unit
105 Path planning unit
106 Robot control information creation unit
107 Robot drive unit
108 Movement path creation unit
109 Movement speed planning unit
300 Mobile device
301 Camera
302 Sensor
303 Data processing unit
304 Position information acquisition unit
305 Input unit
306 Output unit
307 Communication unit
308 Storage unit (memory)
350 GPS satellites
500 User terminal
501 Data processing unit
502 Storage unit (memory)
503 Communication unit
504 input unit
505 Output unit
506 Display unit

The invention claimed is:

1. A mobile device comprising:
a transceiver;
an information processing device, comprising:
a movement path creation circuit that:
creates a following path for following a second mobile device based on position information about the second mobile device, and
transmits the following path to a drive unit of an autonomous mobile object that is configured to follow the second mobile device,
wherein the movement path creation circuit:
sequentially receives first and second pieces of information about a path of the second mobile device as the second mobile device moves along the path, the first and second pieces of information about the path of the second mobile device comprising corresponding speed and direction information,
based on the sequentially received information, sets a first piece of following path position information a predetermined distance from the second mobile device, followed by setting a second piece of following path position information, the first and second pieces of following path position information comprising corresponding first and second pieces following path location and direction information,
connects the set first and second pieces of following path position information to create the following path.

2. The mobile device according to claim 1, wherein the predetermined distance from the second mobile device is determined in accordance with a predetermined rule based on a position and a travel direction of the second mobile device.

3. The mobile device according to claim 1, wherein the movement path creation circuit sets the first and second pieces of following path position information on a first and second circle respectively centered on a first and second position of the second mobile device and at a position of a predetermined angle with respect to a travel direction of the second mobile device.

4. The mobile device according to claim 1, wherein the movement path creation circuit sets a third piece of following path position information upon determining that the second mobile device has moved a predetermined distance from a location corresponding to the second piece of information about the path of the second mobile device.

5. The mobile device according to claim 1, wherein the movement path creation circuit sets each piece of following path position information based on a direction vector connecting an immediately prior position of the second mobile device and a current position of the second mobile device.

6. The mobile device according to claim 5, wherein the movement path creation circuit sets the piece of following path position information on the direction vector upon determining that the second mobile device has changed direction relative to the immediately prior position of the second mobile device.

7. The mobile device according to claim 1, wherein, upon determining that the second mobile device has changed direction, the movement path creation circuit shortens the following path by:
deleting a piece of in-between following path position information between two previously set pieces of following path position information which are at a predetermined separation distance from each other among a plurality of set pieces of following path position information, and
directly connecting the two previously set pieces of following path position information.

8. The mobile device according to claim 1, wherein when a piece of the following path position information is set within or a predetermined distance from an obstacle, the movement path creation circuit performs following path position information position correction processing that corrects the piece of following path position information to a position away from the obstacle.

9. The mobile device according to claim 8, wherein the movement path creation circuit refers to an occupancy grid map to perform the following path position information position correction processing.

10. The mobile device according to claim 1, wherein the mobile device is installed in the autonomous mobile object.

11. A method performed by a mobile device that includes a transceiver and an information processing device comprising a movement path creation, the method comprising:
creating a following path for following a second mobile device based on position information about the second mobile device; and transmits the following path to a drive unit of an autonomous mobile object that is configured to follow the second mobile device, wherein the creating the following path comprises:

sequentially receiving first and second pieces of information about a path of the second mobile device as the second mobile device moves along the path, the first and second pieces of information about the path of the second mobile device comprising corresponding speed and direction information, based on the sequentially received information, setting a first piece of following path position information a predetermined distance from the second mobile device, followed by setting a second piece of following path position information, the first and second pieces of following path position information comprising corresponding first and second pieces following path location and direction information, connecting the set first and second pieces of following path position information to create the following path.

12. A non-transitory computer product containing a instructions for a method performed by a mobile device that includes a transceiver and an information processing device comprising a movement path creation, the method comprising:

creating a following path for following a second mobile device based on position information about the second mobile device; and transmitting the following path to a drive unit of an autonomous mobile object that is configured to follow the second mobile device, wherein the creating the following path comprises:

sequentially receiving first and second pieces of information about a path of the second mobile device as the second mobile device moves along the path, the first and second pieces of information about the path of the second mobile device comprising corresponding speed and direction information, based on the sequentially received information, setting a first piece of following path position information a predetermined distance from the second mobile device, followed by setting a second piece of following path position information, the first and second pieces of following path position information comprising corresponding first and second pieces following path location and direction information, connecting the set first and second pieces of following path position information to create the following path.

* * * * *